United States Patent
Christensen et al.

(10) Patent No.: US 11,299,268 B2
(45) Date of Patent: Apr. 12, 2022

(54) POSITIONING OF IN-SITU METHANE SENSOR ON A VERTICAL TAKE-OFF AND LANDING (VTOL) UNMANNED AERIAL SYSTEM (UAS)

(71) Applicant: California Institute of Technology, Pasadena, CA (US)

(72) Inventors: Lance E. Christensen, Pasadena, CA (US); Brendan J. Smith, Merced, CA (US); Vlad Manzatianu, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 753 days.

(21) Appl. No.: 15/801,790

(22) Filed: Nov. 2, 2017

(65) Prior Publication Data

US 2018/0127093 A1 May 10, 2018

Related U.S. Application Data

(60) Provisional application No. 62/416,606, filed on Nov. 2, 2016.

(51) Int. Cl.
*B64C 39/02* (2006.01)
*G01P 5/02* (2006.01)

(52) U.S. Cl.
CPC .............. *B64C 39/024* (2013.01); *G01P 5/02* (2013.01); *B64C 2201/027* (2013.01); *B64C 2201/108* (2013.01); *B64C 2201/12* (2013.01); *B64C 2201/141* (2013.01); *B64C 2201/165* (2013.01)

(58) Field of Classification Search
CPC ........ G01C 5/06; G01C 5/005; B64C 39/024; B64D 43/00; G05D 1/00

USPC .......................................................... 73/384
See application file for complete search history.

(56) References Cited

U.S. PATENT DOCUMENTS

| 3,020,963 A * | 2/1962 | Hakkarinen .............. G01P 5/06 416/196 R |
| 6,822,742 B1 | 11/2004 | Kalayeh et al. |
| 2010/0310376 A1 * | 12/2010 | Houvener ................. F03B 3/04 416/146 R |
| 2014/0061376 A1 * | 3/2014 | Fisher .................... B64D 27/00 244/62 |
| 2014/0290383 A1 * | 10/2014 | Ashton ................... G01P 5/165 73/861.65 |

(Continued)

FOREIGN PATENT DOCUMENTS

JP  2019090741 A  *  6/2019

OTHER PUBLICATIONS

Translation JP-2019090741-A (Year: 2019).*

(Continued)

*Primary Examiner* — Alexander A Mercado
*Assistant Examiner* — Monica S Young
(74) *Attorney, Agent, or Firm* — KPPB LLP

(57) ABSTRACT

Unmanned Aerial Systems (UAS) for use in the detection, localization, and quantification of gas leaks are provided. More specifically the use of an in-situ sensor mounted to a UAS such that the sensor is positioned in a region unaffected by prop wash that is relatively undisturbed by the effects of the propeller(s) and other environmental conditions when in use is described. Additionally, methods of determining the optimal placement of the in-situ sensor on any given UAS are also provided.

12 Claims, 20 Drawing Sheets

(56) References Cited

U.S. PATENT DOCUMENTS

| | | | | |
|---|---|---|---|---|
| 2015/0321755 | A1* | 11/2015 | Martin | B64C 39/024 244/17.23 |
| 2016/0122018 | A1* | 5/2016 | Matsue | G05D 1/0858 244/17.13 |
| 2016/0144959 | A1* | 5/2016 | Meffert | B64C 39/024 701/3 |
| 2016/0214715 | A1* | 7/2016 | Meffert | B64C 39/024 |
| 2016/0247115 | A1* | 8/2016 | Pons | G06K 7/1413 |
| 2017/0066530 | A1* | 3/2017 | Salzmann | G05D 1/101 |
| 2017/0158320 | A1* | 6/2017 | Bosch | B64C 27/52 |
| 2017/0191829 | A1* | 7/2017 | Van Schoyck | G01C 5/005 |
| 2017/0303590 | A1* | 10/2017 | Cameron | G01P 5/02 |
| 2018/0002011 | A1* | 1/2018 | McCullough | B64C 11/28 |
| 2018/0075834 | A1* | 3/2018 | Fong | H04R 3/04 |
| 2018/0173245 | A1* | 6/2018 | Twining | G05D 1/0669 |
| 2018/0266887 | A1* | 9/2018 | Frank | B64C 39/024 |
| 2018/0370624 | A1* | 12/2018 | Seale | B64C 27/16 |
| 2019/0210720 | A1* | 7/2019 | Beckman | B64C 27/57 |

OTHER PUBLICATIONS

"3D Robotics", http://3drobotics.com, 2015.

Crosson, "A cavity ring-down analyzer for measuring atmospheric levels of methane, carbon dioxide, and water vapor", Applied Physics B, Received Jan. 15, 2008, vol. 92, No. 3, pp. 403-408, Revised Jun. 13, 2008.

Davalle, "Gas detection through the ages", http://ehstoday.com, May 1, 2011.

Heath III, "Methane leak detection and measurement technologies", Turkmenistan Symposium on Gas Systems Management: Methane Mitigation, Apr. 26, 2010, 23 pgs.

Massie et al., "Design of a portable optical sensor for methane gas detection", Sensors and Actuators B: Chemical, Feb. 27, 2006, vol. 113, no. 2, pp. 830-836.

Tregoures et al., "Comparison of seven methods for measuring methane flux at a municipal solid waste landfill site", Waste Management and Research, Dec. 1999, vol. 17, No. 6, pp. 453-458.

Wainner et al., "High Altitude Aerial Natural Gas Leak Detection System", PSI-1454/TR-2211, Department of Energy National Energy Technology Laboratory, Pennsylvania, USA, Dec. 2006, 100 pgs.

Yeo et al., "An Empirical Model of Rotorcraft UAV Downwash for Disturbance Localization and Avoidance", American Institute of Aeronautics and Astronautics, Jan. 5-9, 2015, Kissimmee, Florida, 14 pgs.

\* cited by examiner

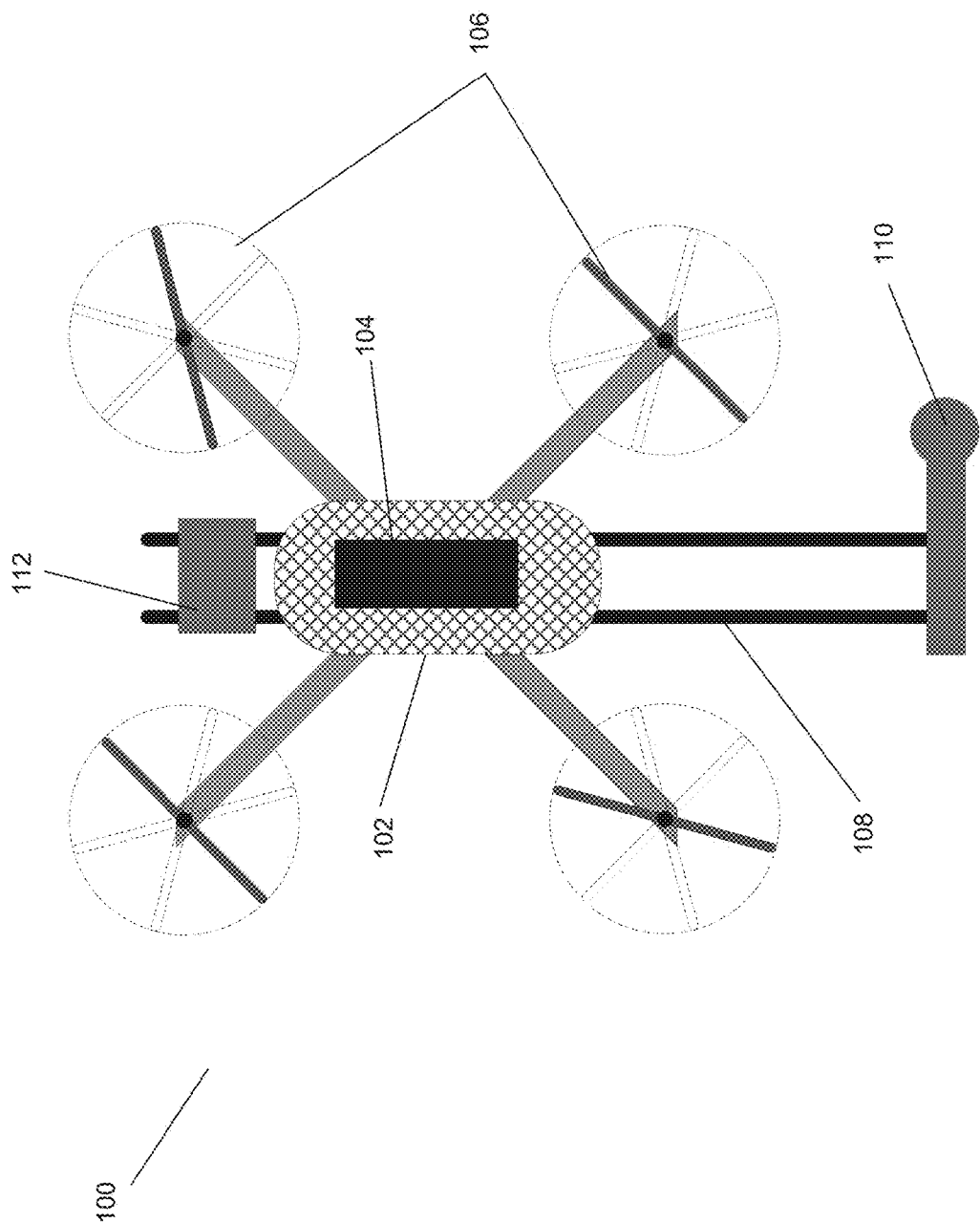

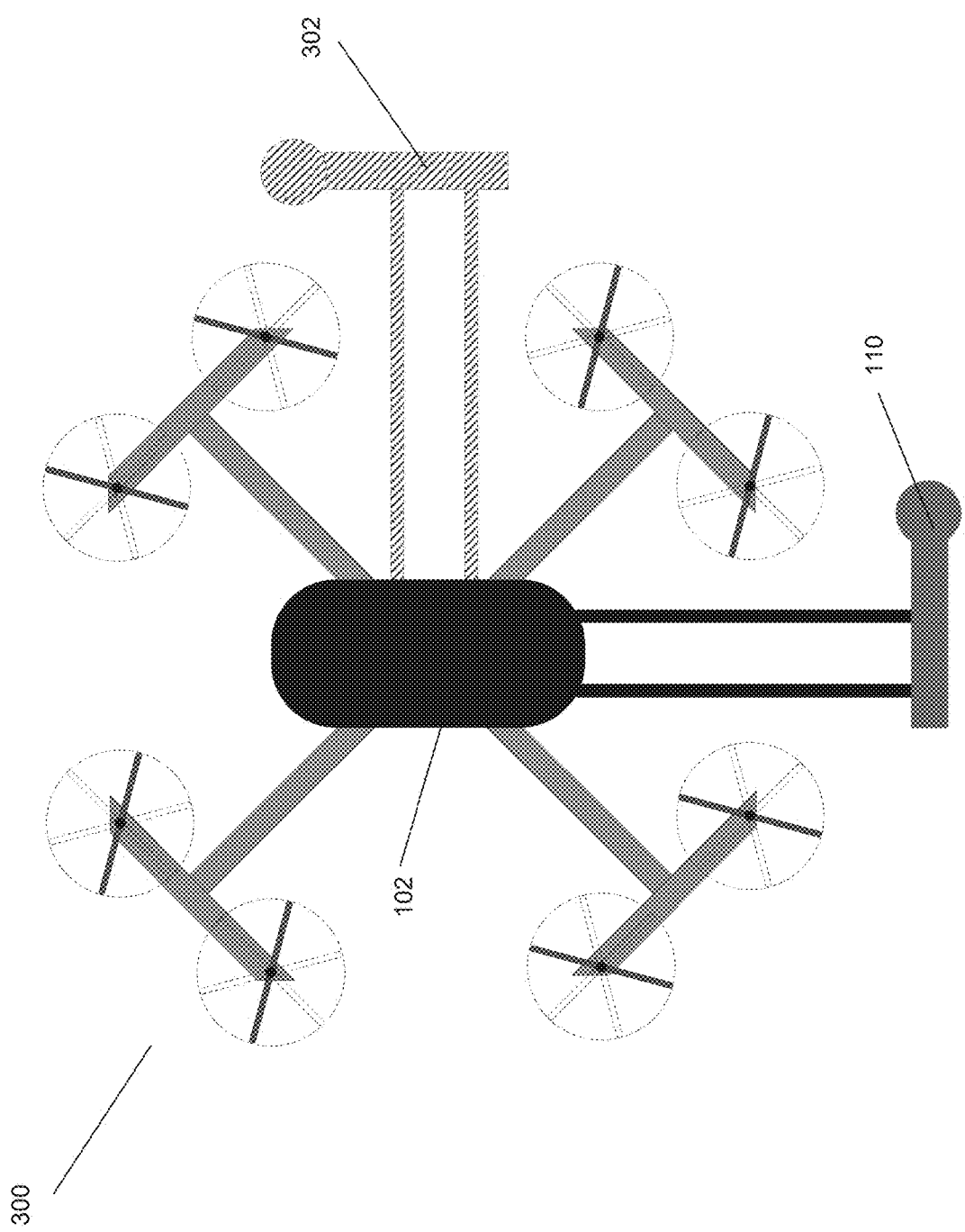

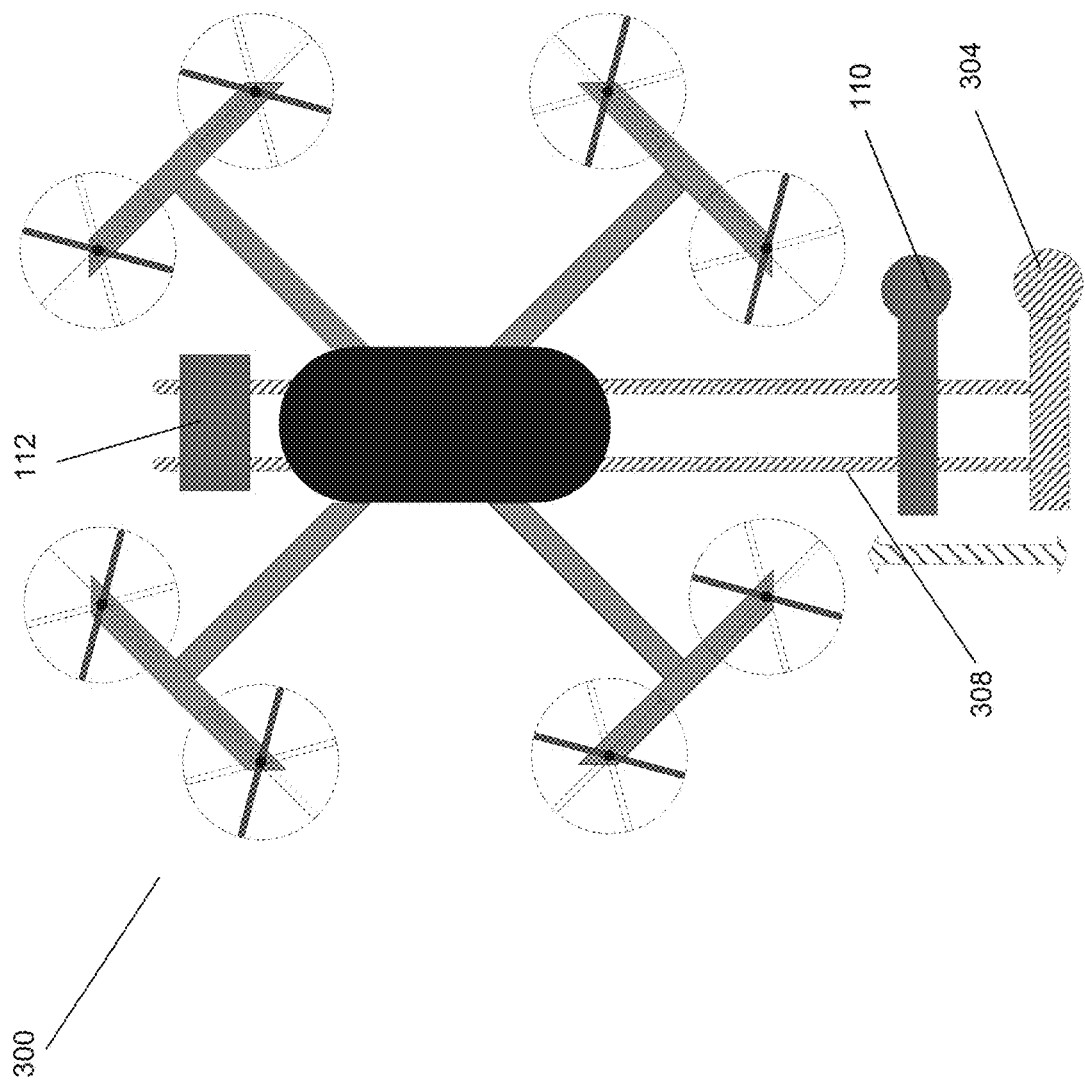

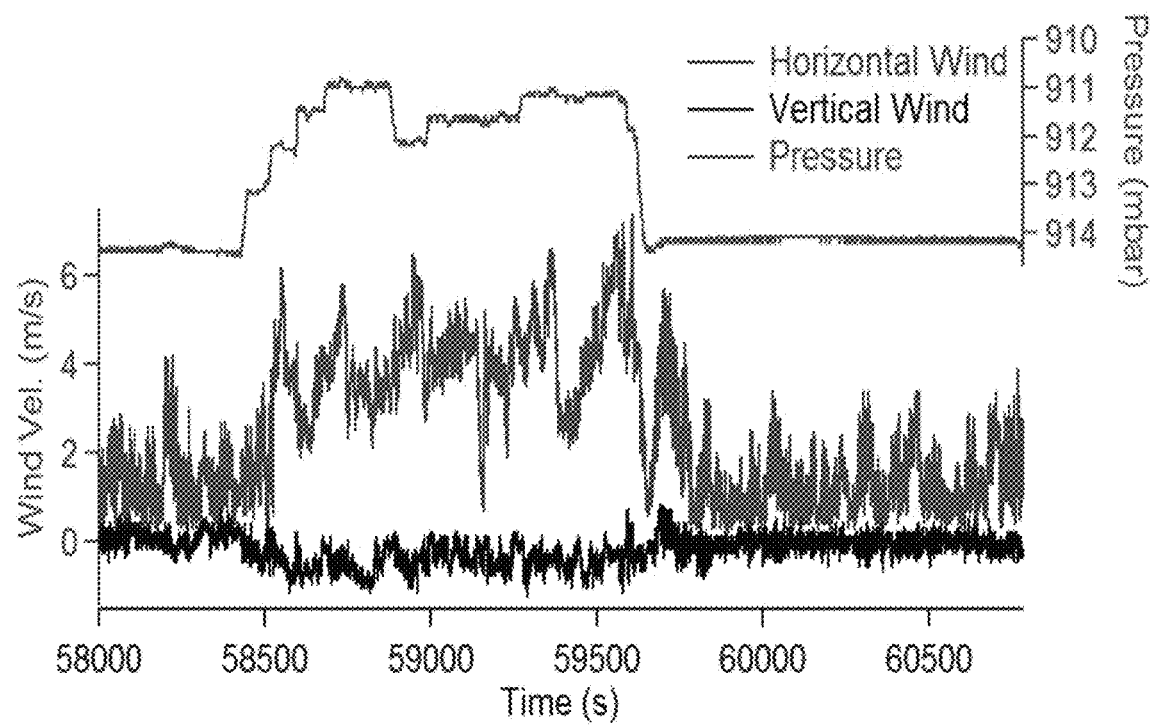
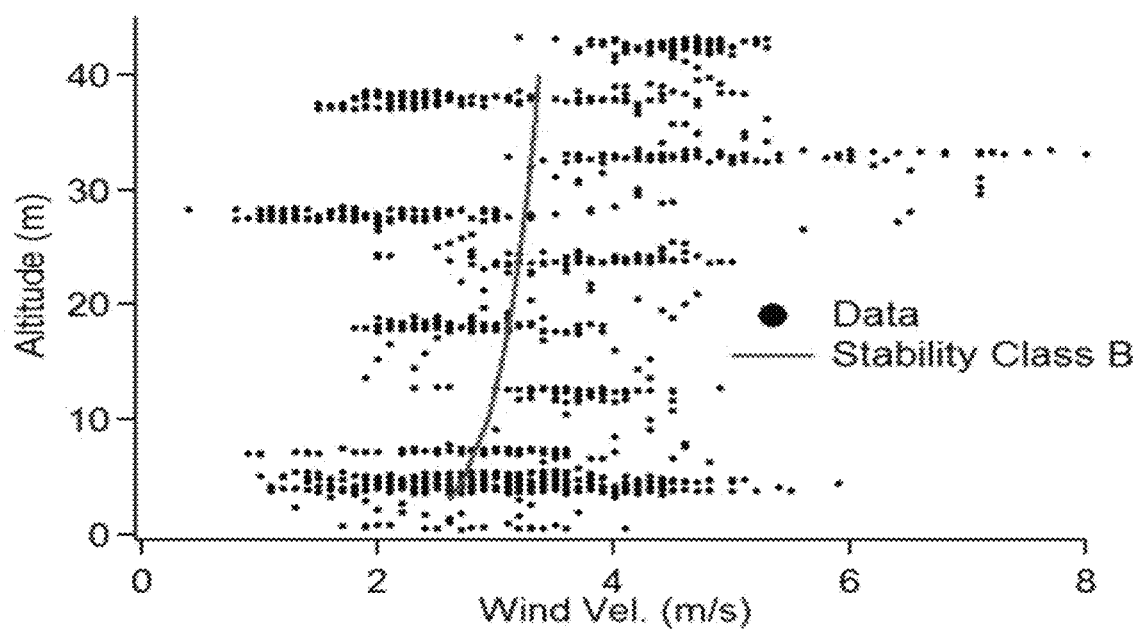
FIG 4B

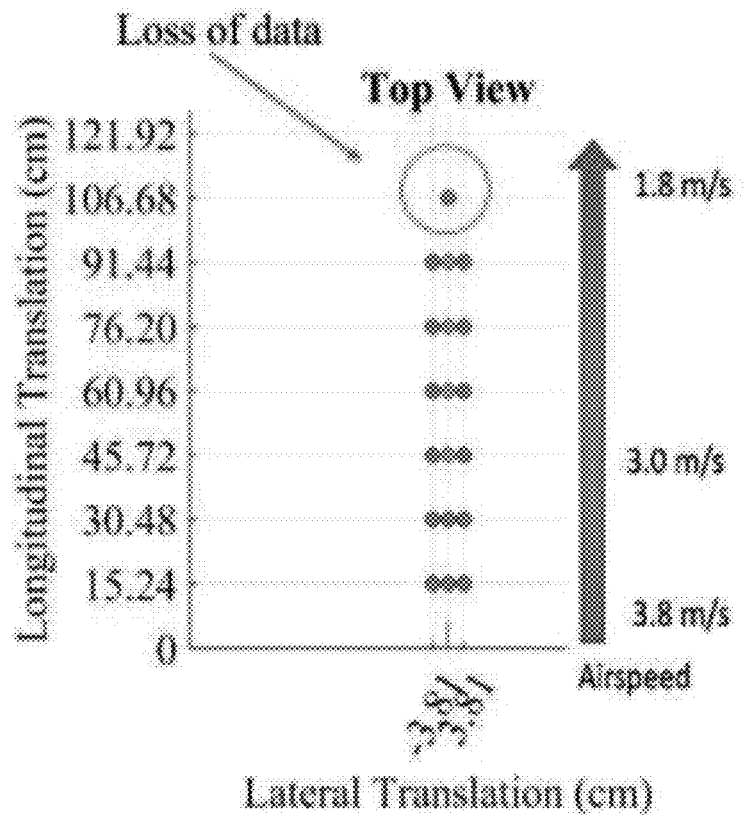
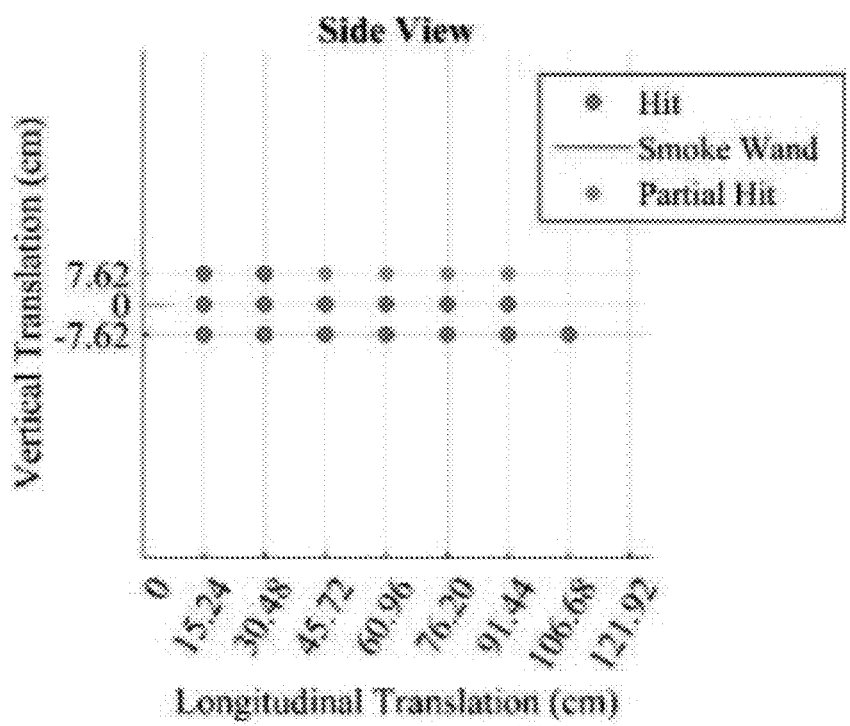
FIG 15

POSITIONING OF IN-SITU METHANE SENSOR ON A VERTICAL TAKE-OFF AND LANDING (VTOL) UNMANNED AERIAL SYSTEM (UAS)

CROSS-REFERENCE TO RELATED APPLICATIONS

This application claims priority to U.S. provisional patent application Ser. No. 62/416,606 entitled "Positioning of in Situ Methane Sensor on a Vertical Take-Off and Landing (VTOL) Unmanned Aerial System (UAS)" filed on Nov. 2, 2016, the disclosure of which is incorporated herein by reference in its entirety.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to the positioning of gas sensors on an Unmanned Aerial System (UAS) sometimes referred to as Vertical Takeoff and Landing (VTOL) vehicles.

BACKGROUND OF THE INVENTION

Methane gas is the second most abundant anthropogenic greenhouse gas after carbon dioxide. It is 25 times more potent as carbon dioxide at trapping heat in the atmosphere. Methane is also the main component in natural gas production. Natural gas has become one of the major resources used for electricity and heat production. As a result, there exist thousands of miles of distribution pipelines across the U.S. that have the potential to contribute to increased greenhouse gases. As such, adequate detection and inspection methods are necessary to help reduce unnecessary amounts of greenhouse gases. Methane is just one example of a greenhouse gas that requires monitoring. Detection methods have been developed in the past using various reliable methane sensors such as portable active remote sensors (RMLD), cavity ringdown spectrometers and infrared methane gas imaging cameras. These systems are logistically difficult and costly to operate and do not offer sufficient spatial coverage since they are operated at the ground level typically through access pathways. The use of manned aircraft is also available but is associated with increased costs and logistical issues because of the requirement for skilled operators.

BRIEF SUMMARY OF THE INVENTION

Systems and methods in accordance with various embodiments of the invention provide Unmanned Aerial Systems (UAS) configured with gas sensing devices to be operated in a variety of environments. In a number of embodiments, the UAS may include a mounting apparatus that is capable of positioning a sensing unit within the in a region unaffected by propeller wash (prop wash) of the UAS. As is crucial to the design, the region unaffected by prop wash of the UAS must be established and potentially re-established based on the environmental conditions Many embodiments are directed to a UAS including a body, a propulsion control system, and a power source connected to the propulsion control system such that the propulsion system is capable of producing a vertical and horizontal propulsion of the UAS. Additionally, the UAS will have a mounting apparatus comprising an elongated body having a first end and a second end wherein the elongated body is connected to the body of the UAS. To allow the UAS to detect, localize, and quantify gas leaks it may further comprise a sensing device moveably connected to the mounting apparatus and configured to be positioned near the first end wherein the sensing device is situationally configured to be positioned within the region unaffected by prop wash of the UAS. The sensing device will be connected to a sensing control device that is moveably connected to the mounting apparatus and configured to be positioned near the second end.

In other embodiments, the unmanned aerial system further comprises at least one anemometer connected to the body of the UAS and is configured to utilize data from at least one propulsion control system and at least one sensing device.

In still other embodiments the anemometer is configured to be positioned at a distance between 10 cm and 2 m.

Yet in other embodiments at least one anemometer is in signal communication with the at least one sensing device and the at least one sensing control unit.

Yet still in other embodiments at least one mounting apparatus is configured to have two elongated bodies, each having a first end and a second end known as the first and second end of the mounting apparatus, wherein at least one sensing device and at least one sensing control unit are configured to be slidingly engaged with the two elongated bodies and wherein at least one sensing device is configured to be positioned at the first end and at least one sensing control device is configured to be positioned at the second end.

In many embodiments at least one mounting apparatus may be configured to be a truss like structure having a first edge and a second edge wherein the first edge is connected to the second edge by a plurality of interconnection bridges.

In other embodiments the unmanned aerial system further comprises at least one motor system connected to a sensing device and a sensing control unit and electronically connected to a power source, whereby the motor system may coordinate the movement of the sensing unit and the sensing control unit such that as environmental conditions change thereby affecting the region unaffected by prop wash, the sensing device may be repositioned to remain within the region unaffected by prop wash and the sensing control device may be repositioned to effectively counterbalance the sensing device.

In still other embodiments the at least one sensing device and the at least one sensing control device are collocated within a single housing.

Yet in other embodiments the unmanned aerial system further comprises at least one motor system connected to a sensing device collocated with a sensing control unit and electronically connected to the at least one power source, whereby the motor system may coordinate the movement of the sensing unit collocated with the sensing control unit such that as environmental conditions change thereby affecting the region unaffected by prop wash, the sensing device may be repositioned to remain within the region unaffected by prop wash Many embodiments are directed to a method for determining the optimal placement of a gas sensor on a Unmanned Aerial System comprising:

Selecting at least one UAS for use in mounting a gas sensor, selecting at least one gas sensor for mounting on said UAS;

Mounting the at least one sensor on at least one UAS;

Evaluating airflow disturbance through static testing;

Evaluating airflow disturbance through dynamic testing; generating a composite sketch of air flow disturbance based on static and dynamic testing results;

Selecting at least one smoke visualization test wherein at least one smoke visualization tests may indicate static and dynamic air flow regions around the at least one UAS and where the smoke visualization test follows a procedure selected from the group consisting of propeller downwash, regions unaffected by prop wash, lawn mower patter, and roll/pitch/yaw;

Performing at least one flight test with said at least one UAS and at least one sensor; Compiling data from the airflow disturbance composite test, at least one smoke visualization test, and at least one flight test; and Selecting at least one optimal location where in the static and dynamic air flow regions are optimal for at least one gas sensor to detect gas.

Other embodiments are directed to a method, wherein the at least one flight test consists of utilizing at least one smoke plume for testing.

Still other embodiments are directed to a method wherein at least one flight tests consists of flying the UAS at a flight speed of at least 2 m/s through at least one smoke plume.

Yet, other embodiments are direct to a method of wherein at least one flight test consists of flying the UAS directly above at least one smoke plume.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 1 illustrates one embodiment of the invention featuring a top view of a UAS with a sensor mounted.

FIG. 3A illustrates another embodiment of the invention further illustrating various mounting positions of the sensor.

FIG. 3B illustrates yet another embodiment of the invention further illustrating an adjustable sensor position.

FIG. 4B provides graphical representations of the wind speed versus time as well as wind speed versus altitude.

FIG. 15 illustrates the top and side view results of a smoke plume reconstruction using a UAS mounted optical sensor.

DETAILED DESCRIPTION OF THE INVENTION

Figure 2B:
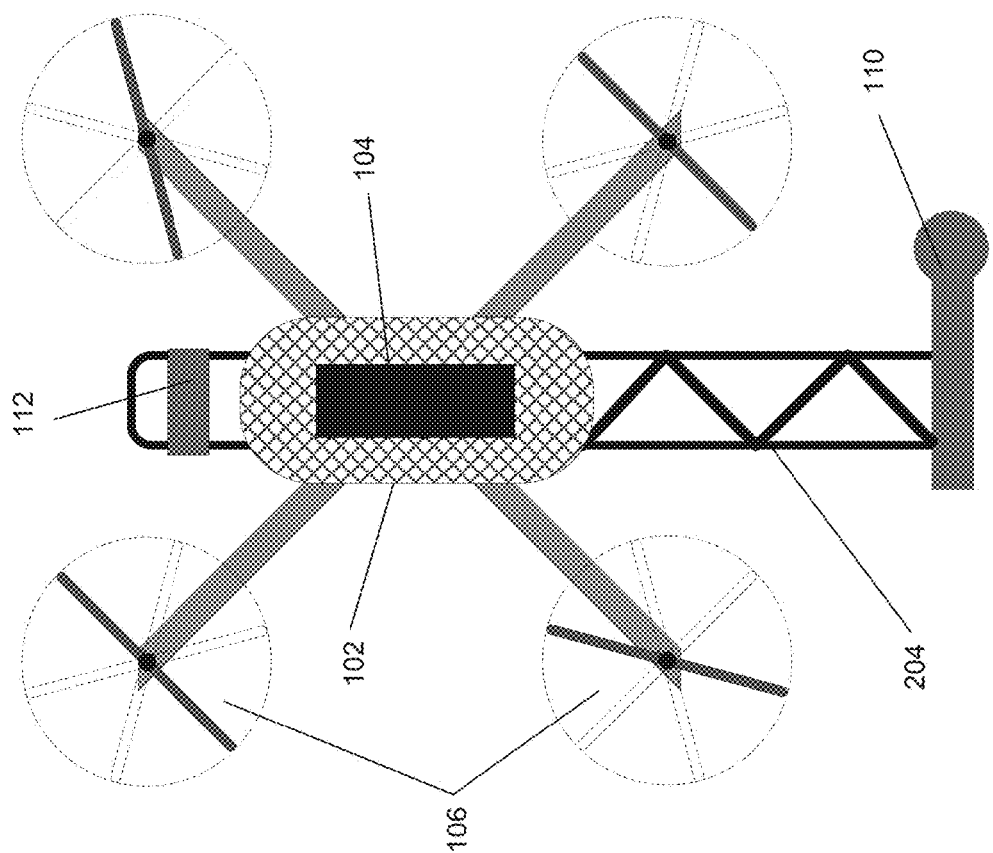
FIG. 2B illustrates another embodiment of the invention with a sensor mounted using a different version of a mounting device.

Turning now to the drawings, methods and apparatus for leak detection, localization, and quantification using a UAS are disclosed.

A potential solution for cost efficient and logistically proficient leak detection, localization, and quantification method is the use of unmanned aerial systems or small-unmanned aerial systems (sUASs). Natural gas production and distribution companies are making an effort to use UASs to perform leak detection, localization, and quantification operations.

sUASs classification of vehicles are limited to systems that are 25 kg (55 lbs.) or less. Micro-unmanned Aerial Systems (μUAS) are a subclass of sUASs that are limited to 2 kg (4.4 lbs) or less. There are a variety of sUAS that can be used for leak detection including rotary winged and fixed winged aircraft. Rotary winged aircraft include a classification of vehicles that operate similar to a helicopter where the lift is generated by rotating propellers. A typical implementation of such vehicle is classified as a Vertical Takeoff and Landing (VTOL) vehicle. VTOL's are ideal for leak detection because of the availability of the aircraft, the low cost, and the ease of operations. Furthermore, such vehicles are increasing in technology to implement the use of automated systems.

Rotary aircraft like VTOLs are extremely disruptive to the air volume surrounding them in flight due to the effects caused by propeller wash or prop wash. Prop wash is the phenomenon in which a spiral slipstream is formed by the rotation of the aircraft propeller blades. This phenomenon is why implementation of in-situ gas sensors on VTOLs is difficult.

Comprehensive evaluation of the various UASs is required because each UAS varies in its capabilities and environmental disturbances that can ultimately affect the ability to accurately gather data with onboard in-situ gas sensors. The disturbances created by the UAS in operation as well as the surrounding environment create unique challenges for adequately detecting gas leaks without disturbing or modifying the onboard gas sensor.

Traditional sensing techniques can require modifications to the sensor including the addition of a sampling tube to extend the area sampled by the sensor beyond the effects of the propellers. Additionally, some systems are designed with shrouds that cover the sensor completely in hopes of shielding it from environmental factors. Each of these methods modifies the ability of the sensor to sample the environment, and can have the effect of reducing the accuracy of the gas leak detection, localization, and quantification. Hence, using unmodified sensors on UASs can be a great advantage for gas leak detection.

Accordingly, many embodiments are directed to gas detection sensors mounted to a UAS such that the sensor does not suffer the static and dynamic effects generated by the operation of the UAS.

Various embodiments of the invention are directed a UAS that has a propulsion system which produces both turbulent airflow regions and regions unaffected by prop wash. The UAS is configured to have an in-situ gas sensor mounted to the UAS for use in the detection, localization, and quantification of leaks. In such embodiments the sensor may be mounted on an elongated body and in a manner that positions the sensor within the region unaffected by prop wash and configured to operate effectively therein. The sensor's operation is controlled by a control module. In some embodiments the control module may be mounted separate from or collocated with the sensor itself.

In many embodiments the sensor may be positioned at various locations depending on the location of the region unaffected by prop wash.

In some embodiments the UAS may be further configured to utilize the capabilities of an anemometer in conjunction with the mounted sensor to ensure the environmental effects on the sensor are minimized. The anemometer may communicate with the sensor as well as the UAS to adjust flight patterns according to the readings from the sensor. Thus allowing for increased accuracy in detecting, localization, and quantification leaks.

Other embodiments of the invention are directed to the method in determining the location of the region unaffected by prop wash. In such embodiments a method may include a variety of steps including selecting a UAS with stagnant and turbulent airflow regions and performing a variety of tests in a controlled and environmentally variable conditions. Such tests may include; smoke wand tests, smoke plume flight tests, and overall data composite reconstruction tests.

In accordance with many embodiments of the invention, as illustrated in FIG. 1, a UAS 100 may be configured with a body 102 and a control system 104 that work to control the flight of the UAS 100 by controlling the operation of the various rotors 106.

In many embodiments a sensor 110 may be mounted to a UAS 100 in such a manner that the sensor 110 is located within the region unaffected by prop wash 1104 of the UAS. The region unaffected by prop wash 1104 is the product of the location and function of the rotors 106 of the UAS. In some embodiments the region unaffected by prop wash 1104 may be located in front of the UAS 100. The determination of the region unaffected by prop wash 1104 is further illustrated in FIGS. 5 through 15.

In some embodiments the sensor 110 may mounted to a separate mounting structure 108 that may be subsequently mounted to the body 102 of the UAS 100. Additionally, as illustrated in FIG. 1 many embodiments may encompass the sensor electronics control unit 112 mounted to the mounting structure 108 on the opposite side of the UAS 100 for increased flight stability. In other embodiments the sensor electronics 112 may be collocated with the sensor 110. In yet other embodiments the mounting structure may be comprised of multiple elongated bodies. The multiple bodies may be connected to the sensor 110 and the sensor electronics control unit 112.

Figure 2A:
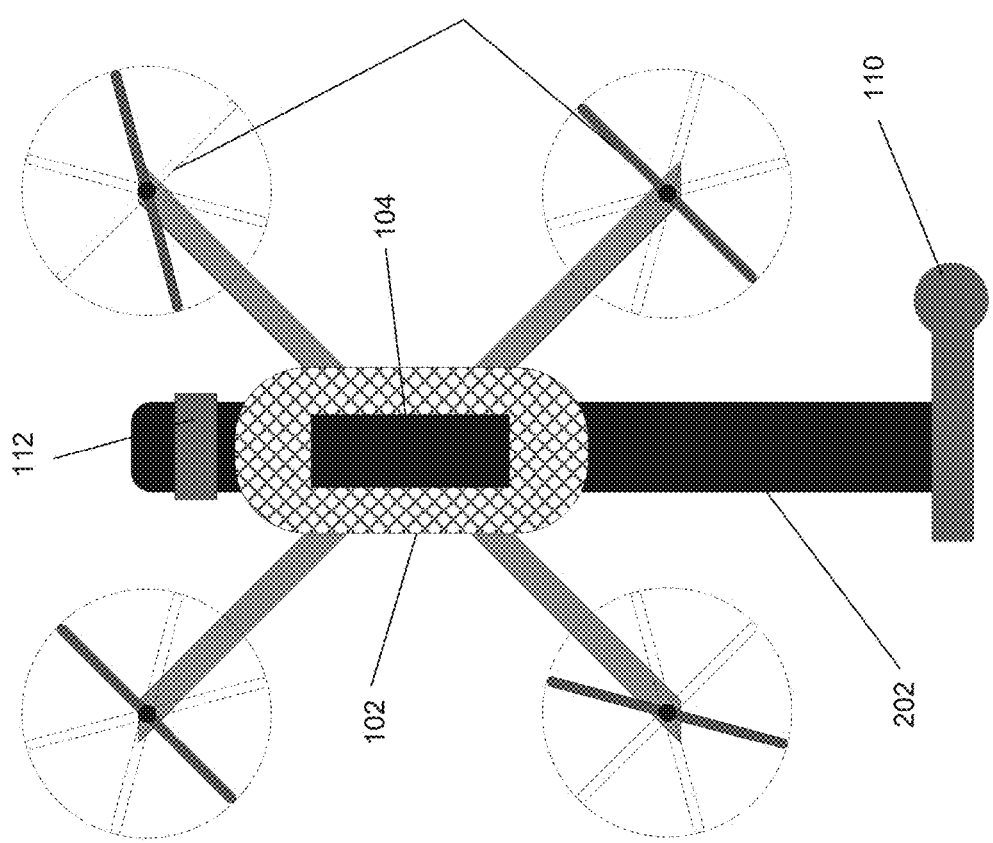
FIG. 2A illustrates one embodiment of the invention with the sensor mounted

In accordance with some embodiments of the invention, as illustrated in FIGS. 2A and 2B, the mounting structure 108 may have different configurations. In some embodiments the mounting structure may be a pair of elongated rods as illustrated in FIG. 1. Yet, in other embodiments the mounting structure 108 may be a solid structure 202 configured to mount to the body 102 of the UAS 100. Yet further in some embodiments the solid structure 102 may be configured to incorporate the sensor electronics control unit 112.

In other embodiments the sensor 110 may be located on a truss like structure 204. Further the sensor electronics control unit 112 may be located on the truss structure 204 to the rear of the UAS 100. In some embodiments the truss structure configuration may continue through the entire mounting structure.

Further and in accordance with some embodiments of the invention, the UAS 100 may take on different configurations as illustrated in FIG. 3. The octocopter 300 may be one embodiment of the invention. Although certain embodiments are shown in the figures it should be understood that the UAS may take on any suitable design.

In accordance with other embodiments, the sensor 110 may be located in different locations based on the determination of the region unaffected by prop wash 1104. Accordingly, in many embodiments the sensor 110 may be adjustable on an adjustable support structure 308. In many embodiments the support structure 108 may be static and fixed to the UAS body 102 or in other embodiments, as illustrated in FIG. 3B, it may be dynamic and adjustable.

In some embodiments the region unaffected by prop wash 1104 may be in front of the UAS and other embodiments it may be to the sides of the UAS. As such the sensor may be located in an alternate location 302. As previously mentioned the sensor may be located in a region unaffected by prop wash that is optimal for the increased sensing capabilities of the sensor.

As illustrated in FIG. 3B and in accordance with many embodiments of the invention, the sensor location 304 may be further adjustable on an adjustable support structure 308 or a static support structure. As the UAS can take on any suitable form it would therefore be crucial to the invention to be able to adjust the position of the sensor for optimal reading capabilities. Additionally, there are many factors that can affect the ability of the sensor to accurately detect the desired substance such as methane. Here, it may be necessary to adjust the sensor on any given UAS configuration, similar to that illustrated in FIG. 3B, to account for external factors that may further affect the location and behavior of the region unaffected by prop wash 1104. Therefore adjustability and adaptability are important to the use of the invention. Although certain embodiments of the support structure are illustrated it should be understood that any suitable embodiment may be used.

Figure 4A:
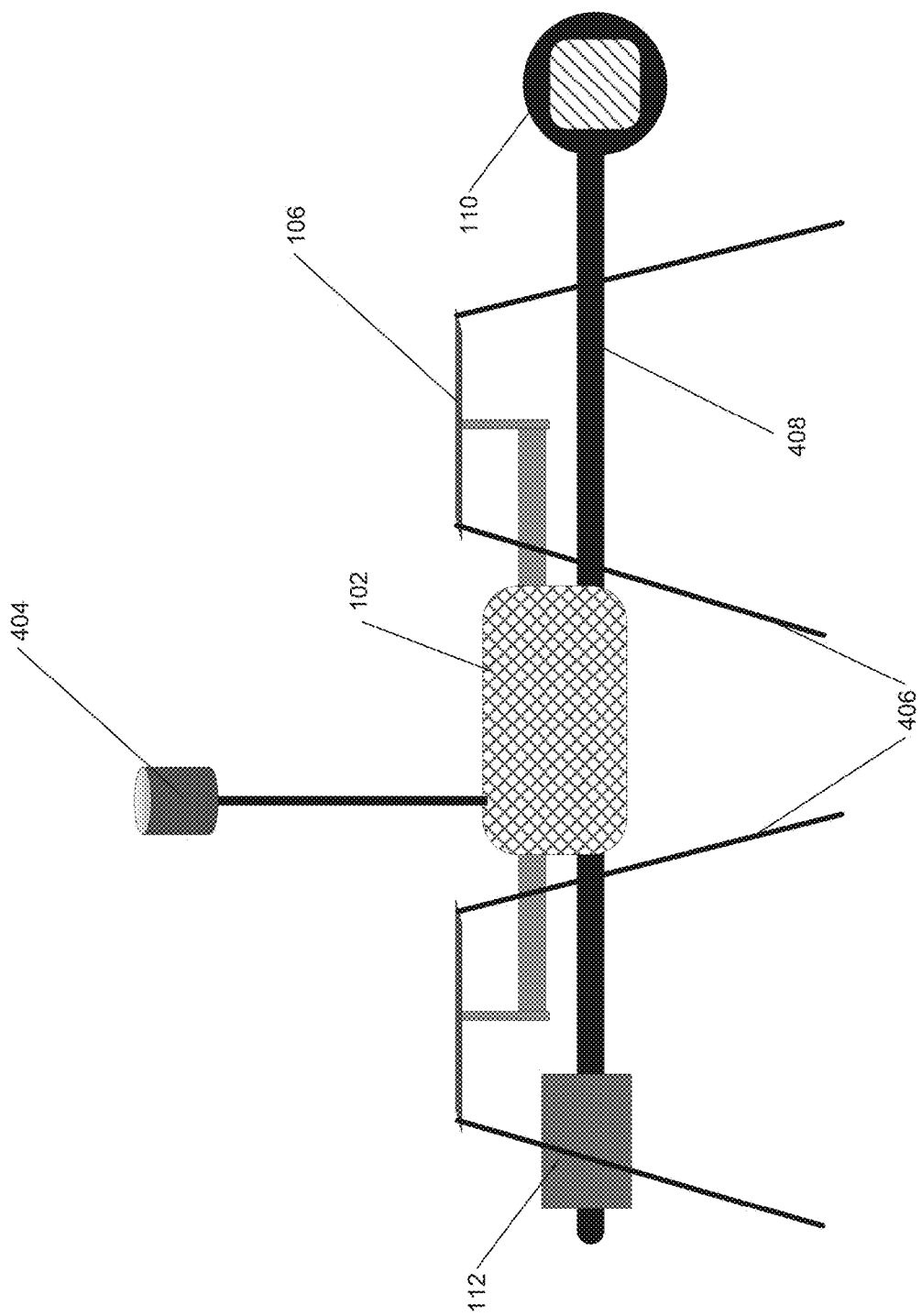
FIG. 4A illustrates a side view of one embodiment of the invention.

Turning now to FIG. 4A, in accordance with many embodiments of the invention, the UAS may be configured to include an anemometer 404. The ability to detect the changing wind conditions with an anemometer is essential to the accurate detection of any leaking gas. Specifically with respect to the present invention, the incorporation of an anemometer in the UAS 102 will allow the proper location of the sensor 110 such that it is in the region unaffected by prop wash and outside the prop wash zones 406 of the propellers 106. Furthermore, because prop wash zones or active air zones can be affected by changing wind conditions, the use of an anemometer can ensure the optimal positioning of a sensor with respect to the leak.

The importance of the incorporation of an anemometer to the UAS is further illustrated by the graphs in FIG. 4B. In accordance with some embodiments of the invention the placement of an anemometer on the UAS will provide the ability to correct for the effects of the propellers on the wind velocity thus ensuring adequate detection from the onboard sensor. This is further illustrated in the top graph of FIG. 4B where the correction of the horizontal wind velocity is depicted in the increase in horizontal wind velocity.

Additionally, the bottom graph in FIG. 4B further illustrates the importance of having an onboard anemometer for wind measurement. The graph illustrates the wind velocity with respect to the altitude. A simple extrapolation of the data may lead one to anticipate wind velocities being lower than actual by as much as 20%. Improper extrapolation may cause up to a 20% bias in flux measurements from the onboard sensor. Therefore, the use of the onboard anemometer would allow for a more accurate determination of wind speed at altitude and would result in more accurate sensor readings for leak detection.

Figure 4C:
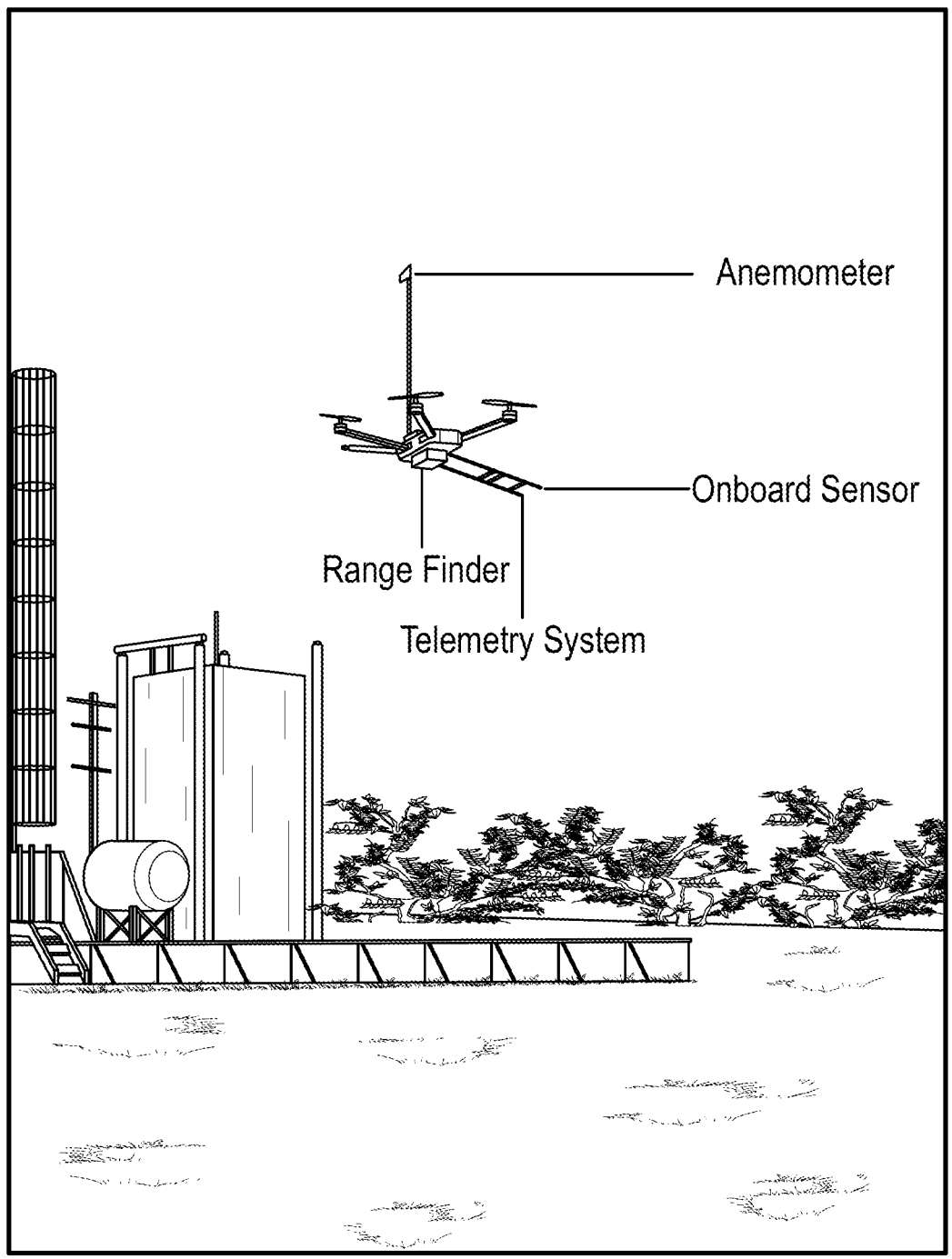
FIG. 4C is an illustration of an embodiment of the invention incorporating the use of an anemometer.

In many embodiments, the anemometer may be located at a distance up to 1 m from the UAS body 102. The use of a UAS in leak detection will often require the UAS to navigate through various environmental conditions resulting in changing external factors such as wind that can dramatically affect the leak plumes and the ability of any sensor to detect them accurately. As illustrated in FIG. 4C in accordance with some embodiments, a UAS is configured with the anemometer as well as the onboard sensor, a telemetry system, and a range finder. Additionally, some embodiments may incorporate a global positioning system with the UAS. Although a specific configuration is shown it should be understood that any suitable configuration may be used.

The combination of a sensor, adjustable or static, with a coordinating anemometer would allow for the UAS more accurately adjust to changing environmental conditions and ensure the most accurate readings possible to better locate the potential leaks in any system. In accordance with some embodiments of the invention the sensor 110 and the anemometer may be in communication such that the overall gas detection is most accurate.

In further embodiments the sensor 110, the sensor electronics control unit may be configured to move autonomously along the structural support 408. In further embodiments the sensor 110, the sensor electronics control unit 112, and the anemometer may be in signal communication and coordination such that as environmental conditions change the various elements may adjust position to ensure the sensor remains in the region unaffected by prop wash 1104.

In some embodiments the UAS may be configured to operate autonomously and receive communications from a centralized or remote location whereby the UAS may leave a docking station and travel to a suspected leak location. At the location the UAS may operate as described herein and return to the docking station. In some embodiments the autonomous UAS may report data continuously to a remote location of may upload the recorded data upon return to a docking station. This may serve as a redundant data acquisition system for use in leak detection.

Figure 4D:
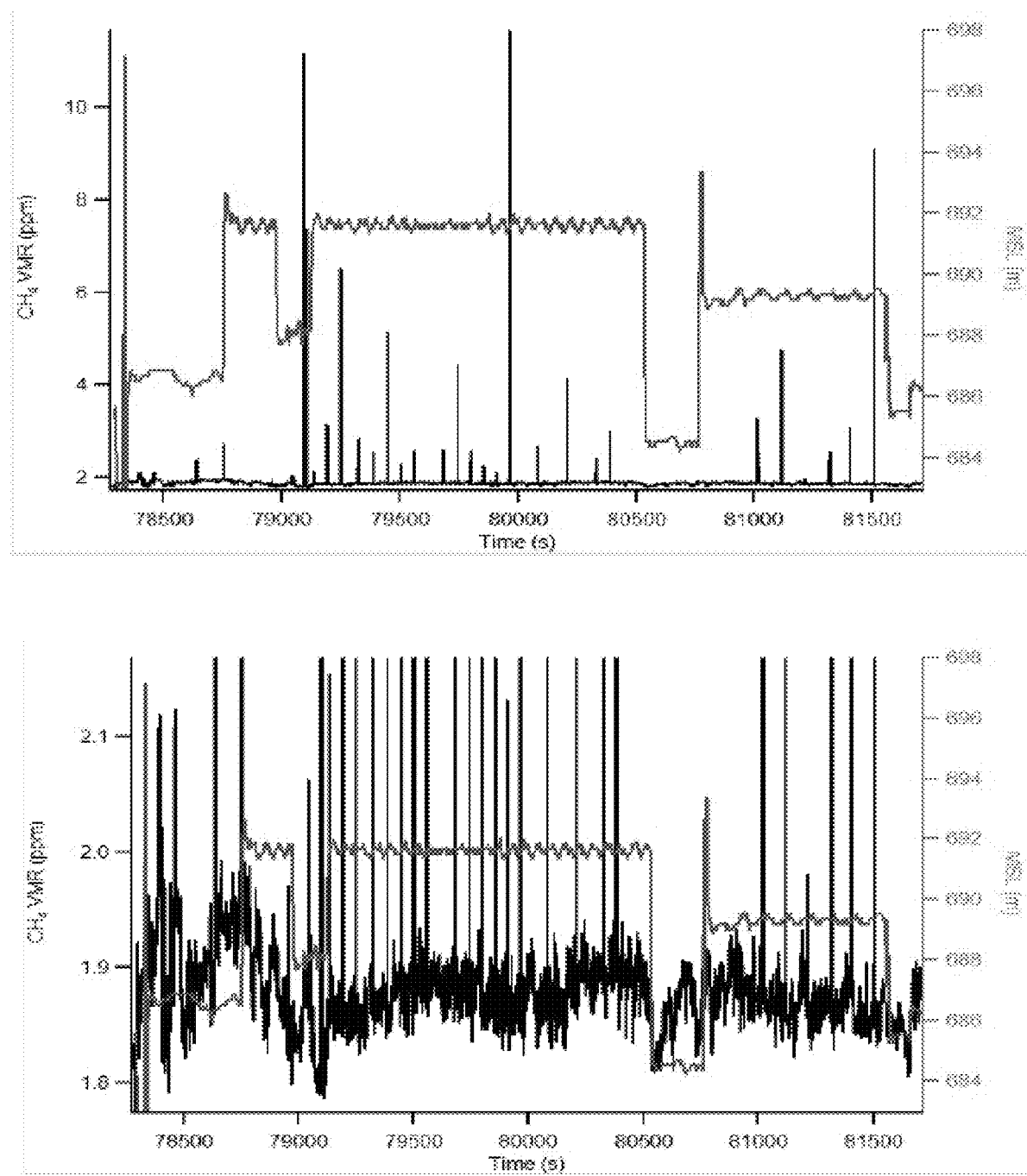
FIG. 4D is a graphical representation of methane detection peaks during several flight tests illustrating the increased detection in accordance with many embodiments of the invention.
Figure 4E:
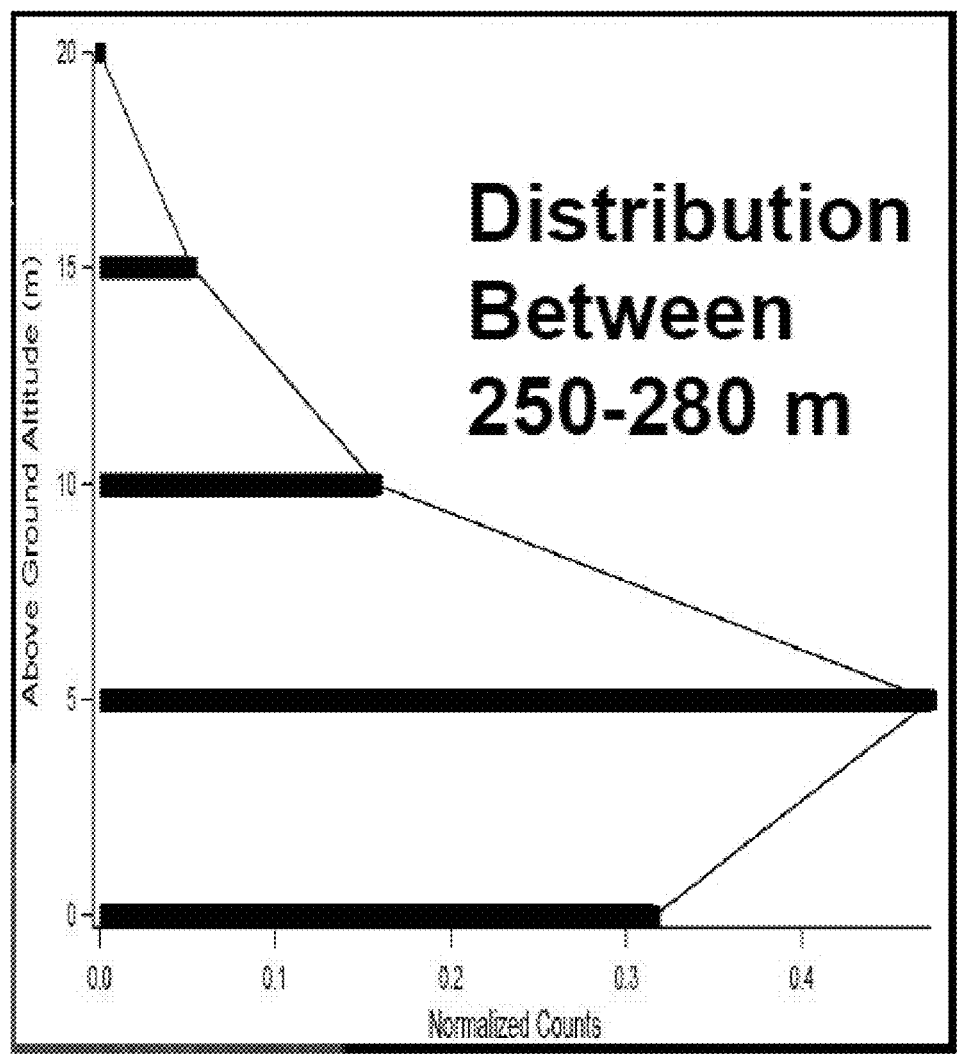
FIG. 4E is a graphical representation of the increased detection at a particular above ground height.

As has been previously described, conditions for adequate detection of gas leaks are critical in obtaining the most accurate detection. Various testing has been done to determine optimal conditions during flights to ensure the most accurate placement of the sensor 110 is obtained for best results. As is illustrated in FIGS. 4D and 4E flight conditions and sensor placement with respect to those can affect the capabilities of the sensor 110. FIG. 4D is a graphical representation of flights where the optimal placement of the sensor 110 in the region unaffected by prop wash is more likely to produce better detection of a gas. In this case a flight at or near 7 m above ground, with the sensor 110 placed in the optimal location produced greater peaks when flying through a leak zone.

FIG. 4E, is a graphical representation of how the sensor is more likely to detect gas leaks at lower vertical positions with respect to the ground. This is likely due to the manner in which the gas leaking further dissipates as altitude and time increase, therefore the leak near the ground is likely to be in greater concentration for easier detection.

Figure 5:
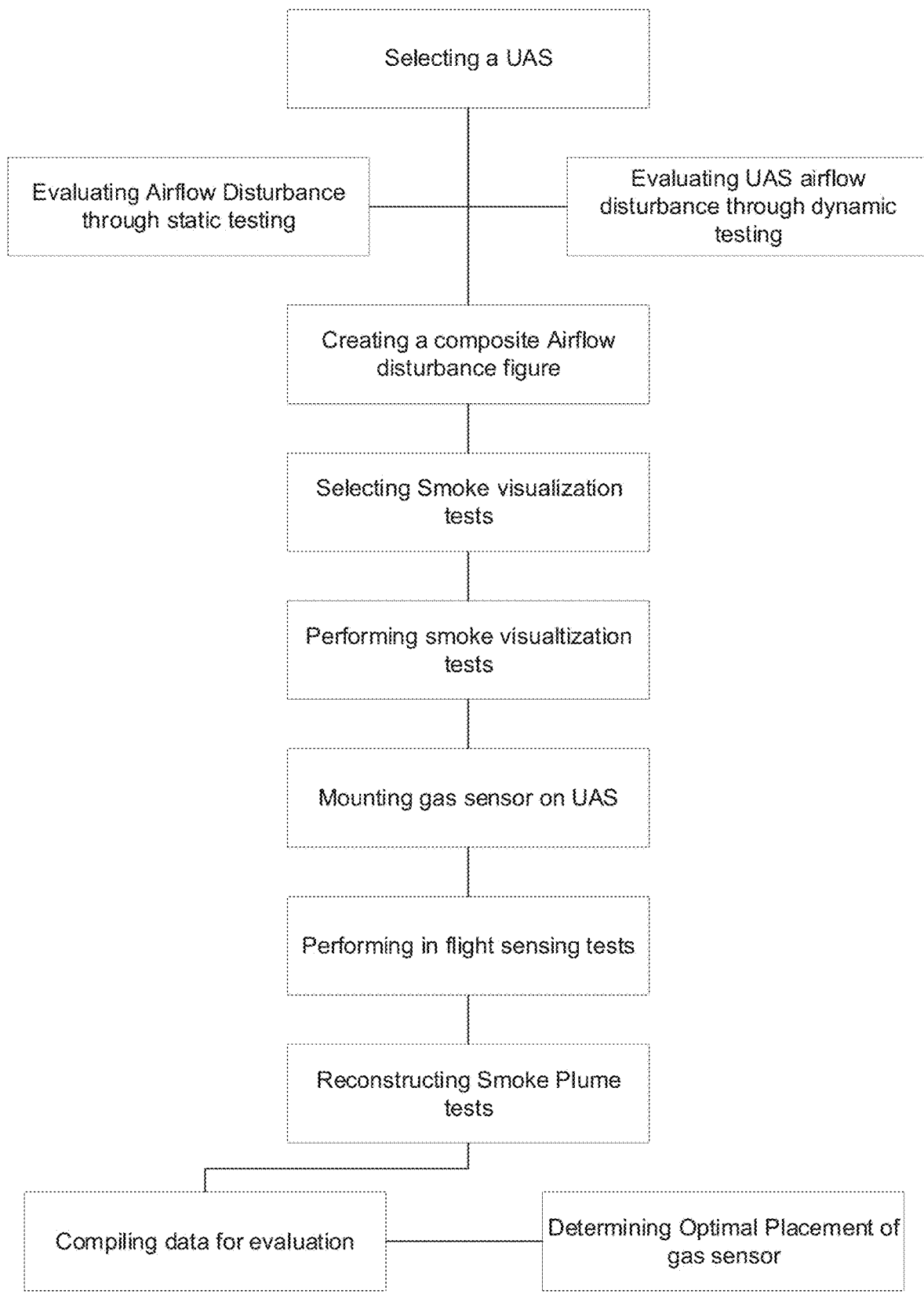
FIG. 5 depicts a flow chart visualization of an embodiment of the invention for determining the optimal placement of a gas sensor on a UAS.

In accordance with many embodiments of the invention a process has been developed whereby users are capable of determining the appropriate location for a sensor 110 on a UAS for optimizing sensing capabilities. In many embodiments, as illustrated in FIG. 5, a process by which the optimal location of a gas sensor on a UAS can be determined. The process, as illustrated by FIG. 5 and in accordance with many embodiments of the invention, may include selecting a UAS, evaluating the airflow disturbance pattern of the UAS, creating a composite airflow disturbance graphical representation, performing various smoke visualization tests on the UAS, mounting a smoke sensor on the UAS, performing flight and static tests of the UAS with the mounted smoke sensor, reconstructing smoke plumes using the smoke sensor and compiling the data. In some embodiments the steps illustrated in FIG. 5 may be performed in sequence.

Figure 6:
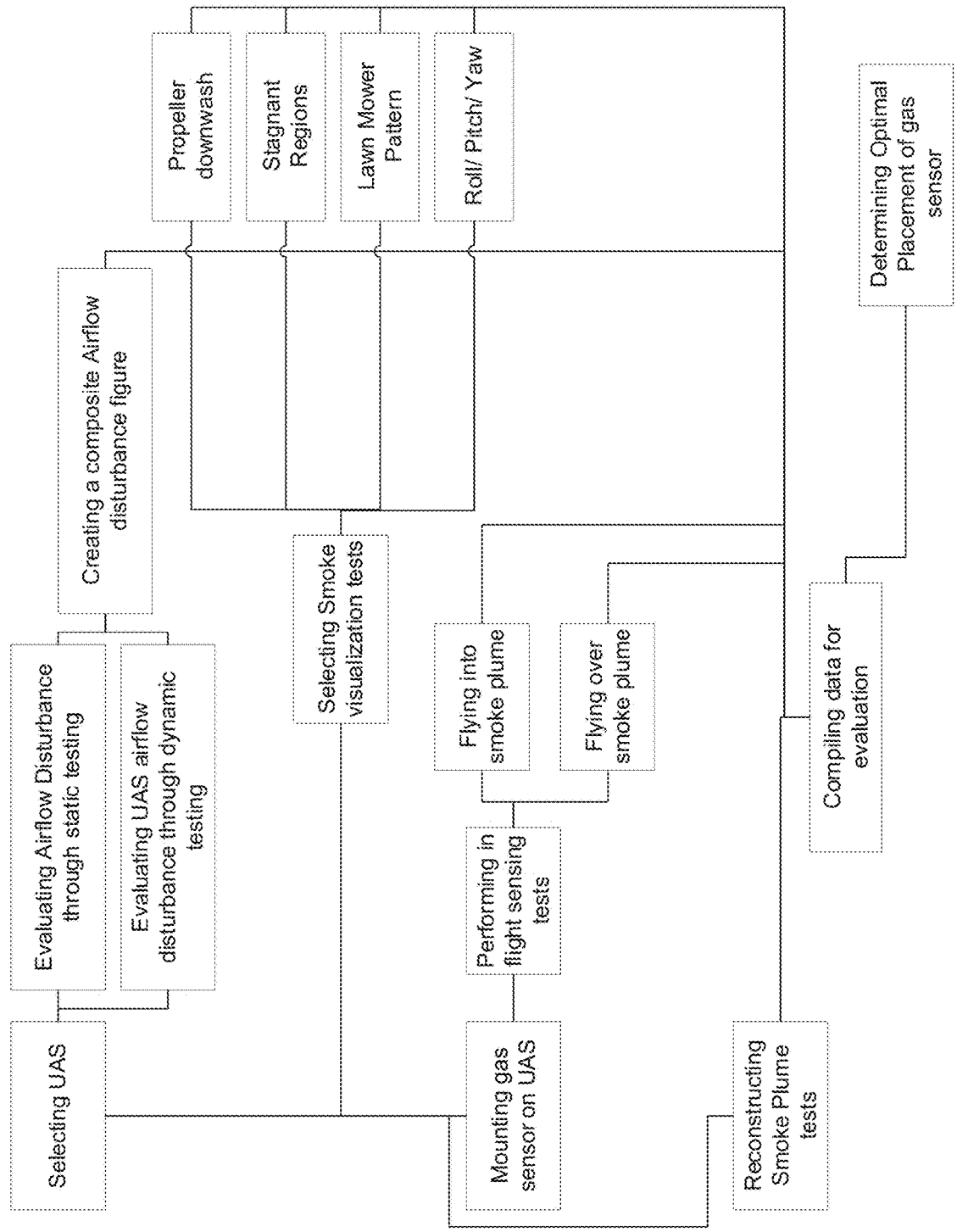
FIG. 6 represents another embodiment of the invention for determining the optimal placement of a gas sensor on a UAS.

As illustrated in FIG. 6, various embodiments of the invention may include parallel process steps by which UAS(s) are selected, gas sensor is mounted, smoke visualization tests are performed, flight tests may be performed, and reconstructing smoke plumes may be done prior to the compilation of data to determine the optimal location of the desired UAS. Furthermore, in some embodiments of the invention the smoke visualization tests may include a propeller downwash, lawn mower pattern, roll/pitch/yaw, or stagnant region tests.

Figure 7:
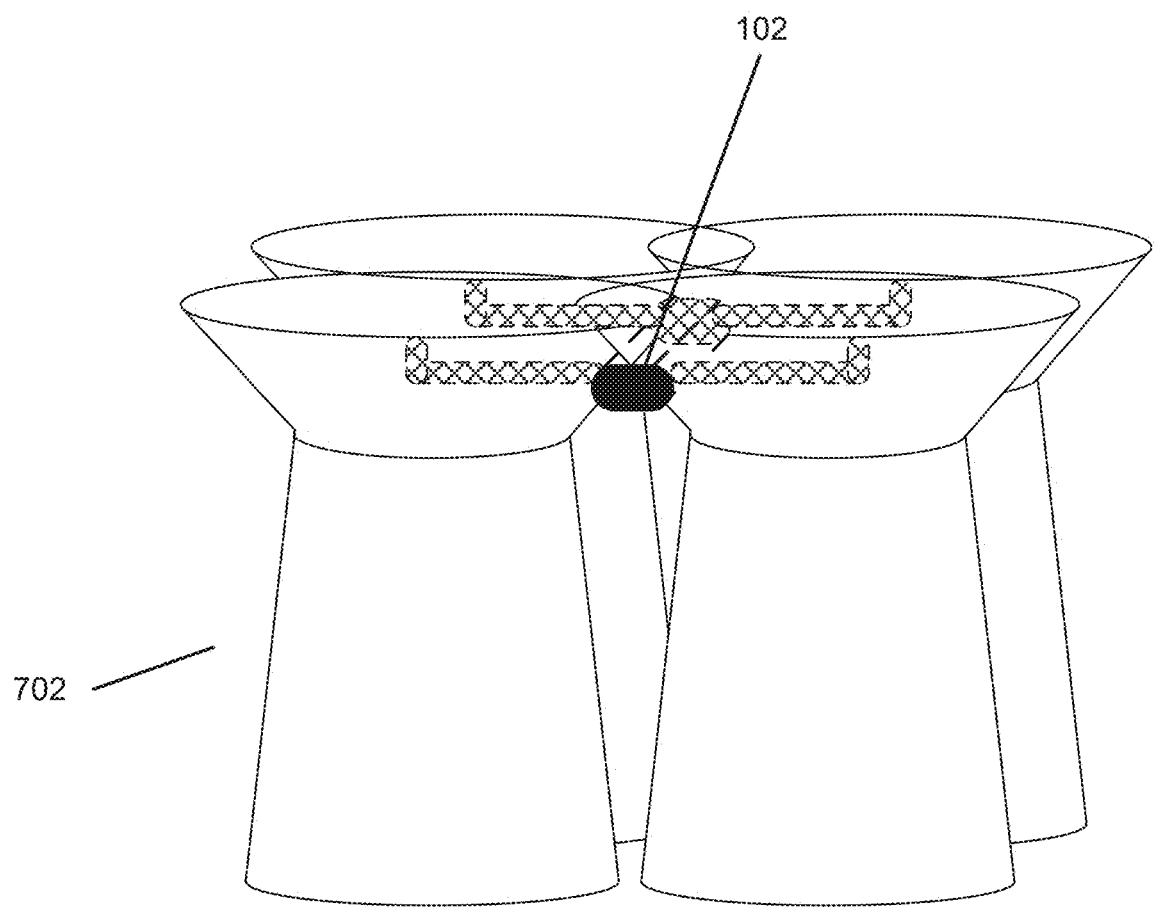
FIG. 7 illustrates a composite visualization of combined results from various smoke visualization tests in accordance with many embodiments of the invention.

Turning now to FIG. 7, in accordance with many embodiments of the invention a composite illustration of the aforementioned gas smoke procedures can be seen. When the gas smoke procedure results are combined to a composite illustration a complete influence region model 702 can be obtained thereby allowing for a better visualization of the influenced and uninfluenced regions. Creating the composite illustration is helpful in adequately locating the all-important region unaffected by prop wash around the selected UAS.

Figure 8A:
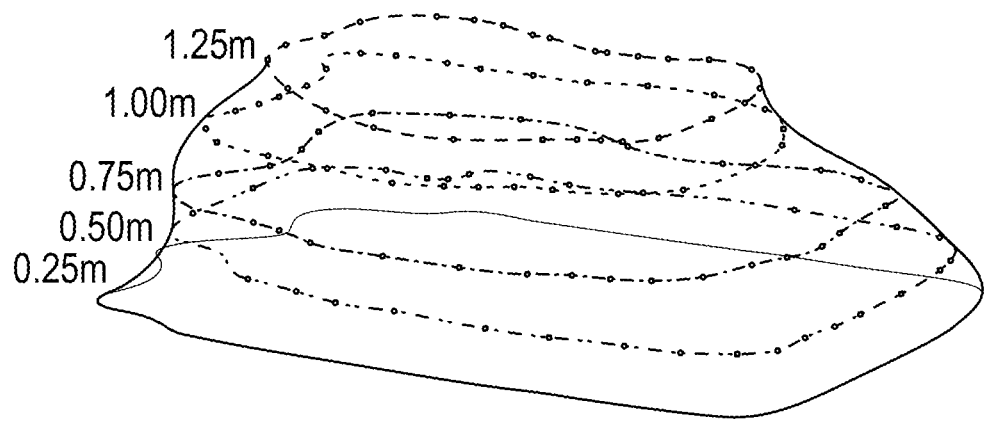
FIG. 8A is a graphical representation of the air flow characterization of a particular embodiment of the invention.
Figure 8B:
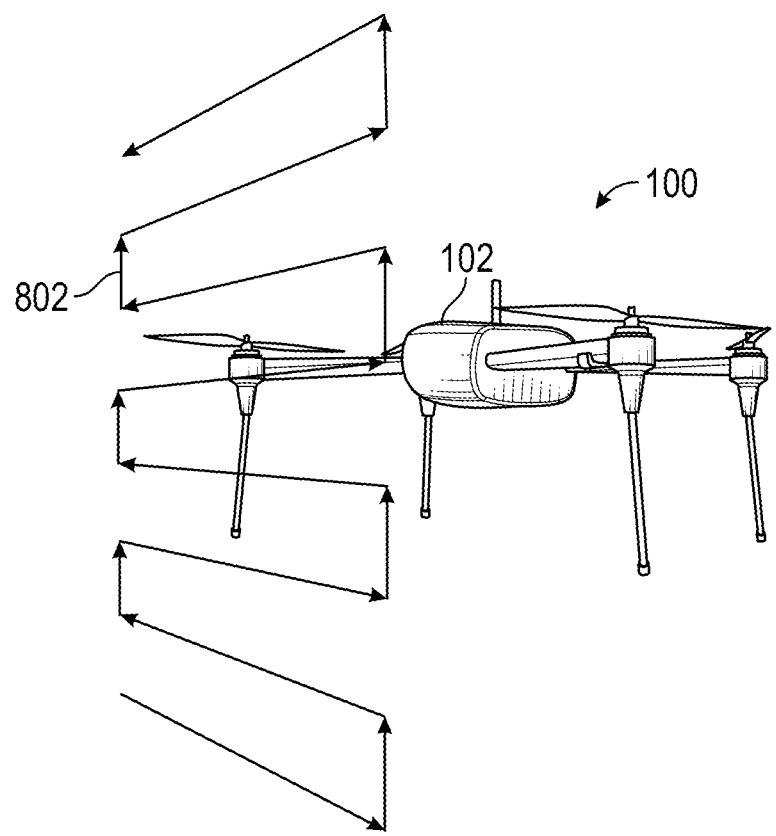
FIG. 8B illustrates one method of a smoke visualization test in accordance with various embodiments of the invention.

A lawn mower pattern as illustrated in FIG. 8B and in accordance with some embodiments of the invention, is a process by which a smoke wand 406 is passed in front of a UAS 100 in a back and forth pattern 802 thus covering the entire body 102 of the UAS 100. The back and forth pattern 802 allows for a complete evaluation of the air flow around the entire UAS to be made.

Figure 9:
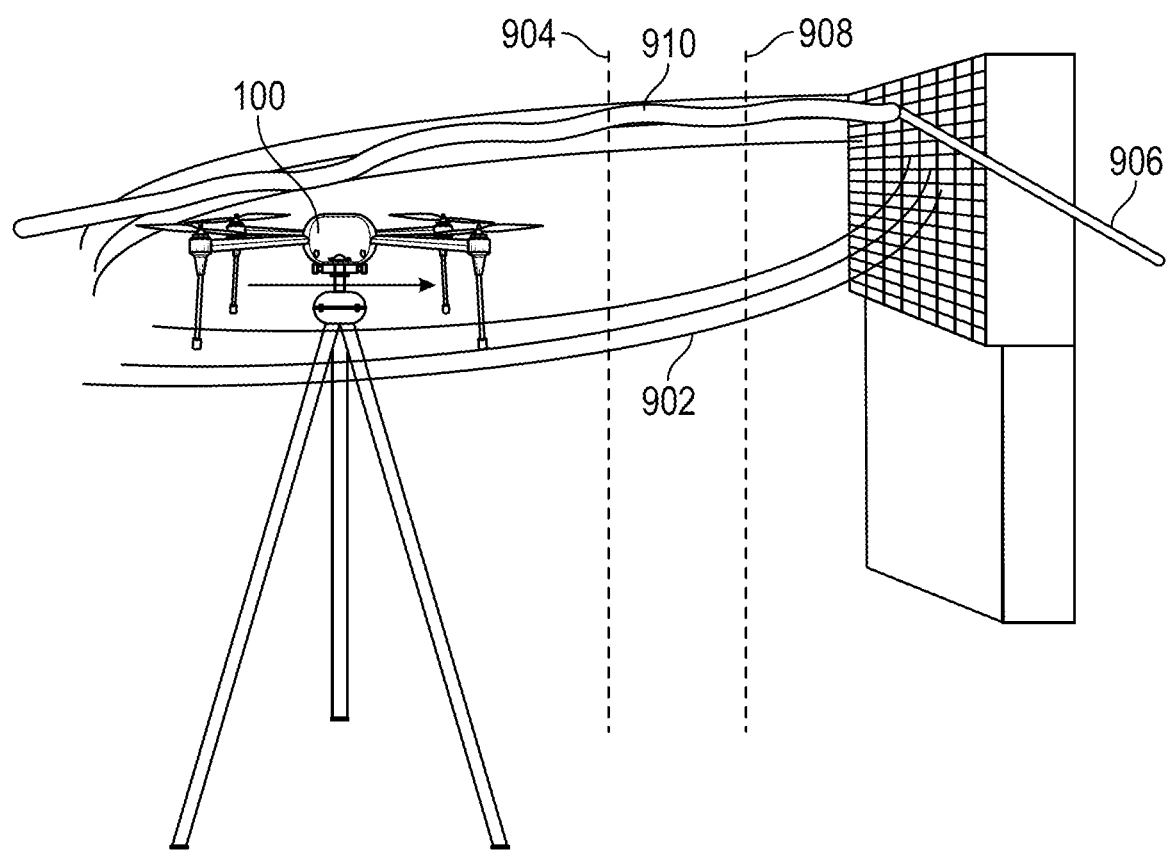
FIG. 9 illustrates a method of a smoke visualization test in accordance with some embodiments of the invention.

Further illustrated in FIG. 9 and in accordance with many embodiments of the invention, the lawn mower procedure shows the airflow characteristics of the smoke 910 as it leaves the smoke wand 906 and is directed to the UAS 100. Specifically, the air flow 902 is directed towards the body of the UAS. As the airflow 902 enters a region of influence 908 and 904 it is directed towards the body of the UAS. The first threshold 908 causes a gradual slope while the second threshold 904 causes an increased slope towards the UAS 100. In some embodiment the UAS may be static in a fixed position as illustrated in FIGS. 9-11B. In yet other embodiments of the invention the UAS 100 may be dynamic in which the pitch, yaw, and roll of the UAS may be adjusted to determine the effects on the surrounding air. Adjusting the pitch, yaw, and roll in various angles can allow for the smoke visualization test to provide additional information with respect to the prop wash affects during in flight operation. Although certain embodiments are illustrated it should be understood that any suitable configuration of the UAS may be used to optimize the collection and compilation of airflow data from the selected UAS.

Figure 10:
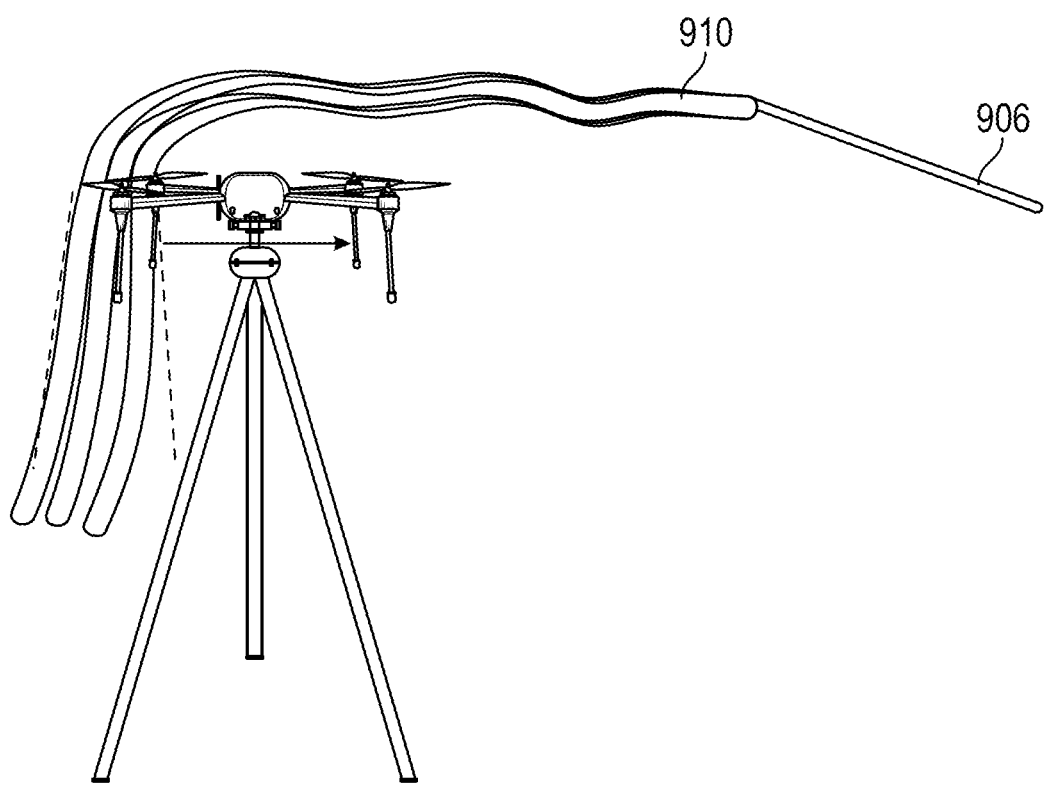
FIG. 10 illustrates the results of a smoke visualization tests in accordance with many embodiments of the invention.

Further smoke visualization tests may be performed in accordance with some embodiments of the invention by which the smoke is passed directly into the paths of the propellers to determine the propeller outtake as illustrated in FIG. 10.

Figure 11B:
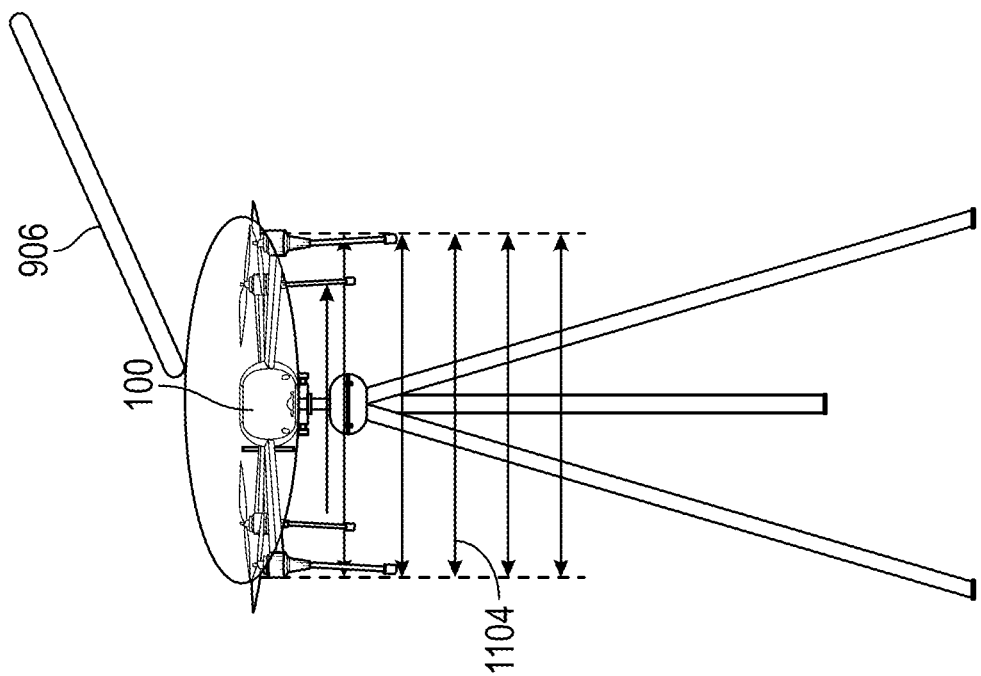
FIG. 11B illustrates the region unaffected by prop wash results of a smoke visualization test in accordance with some embodiments of the invention.
Figure 11A:
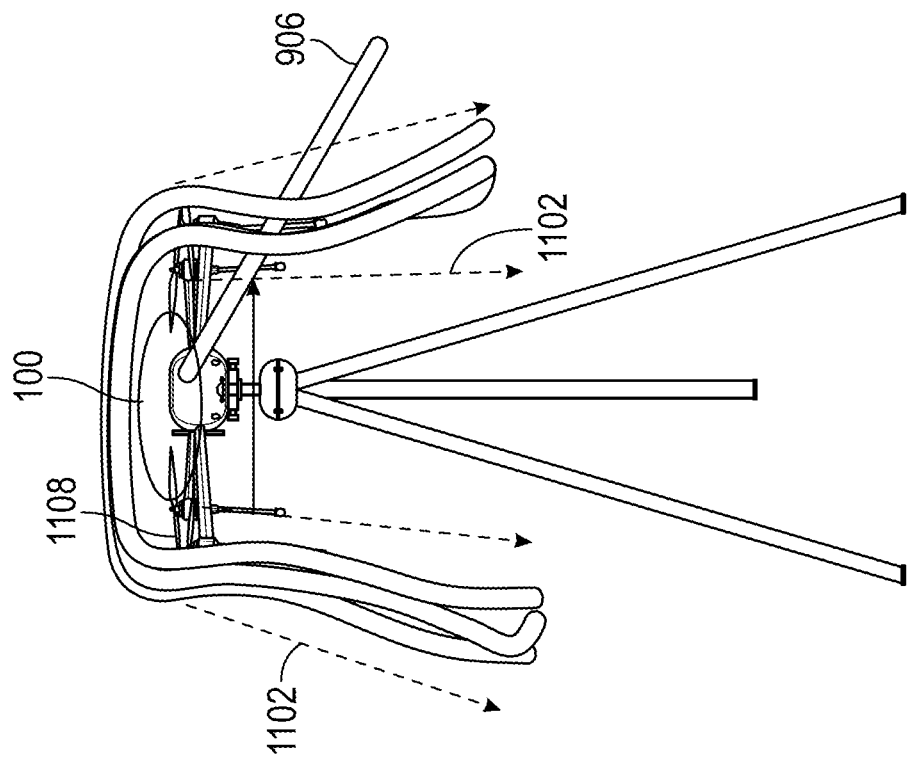
FIG. 11A illustrates the moving air region results of a smoke visualization test in accordance with various embodiments of the invention.

Regions unaffected by prop wash, which are essential to determining the optimal placement of a gas sensor on a UAS may be evaluated in accordance with many embodiments of the invention as illustrated in FIGS. 11A and 11B. FIG. 11A illustrates a smoke wand 906 passing smoke 910 in a moving air method in front of the UAS 100 thereby further illustrating a moving air region 1102 beneath the propellers of the UAS 100. The moving air region 1102 lies directly beneath the propellers and contrast the region illustrated in FIG. 11B.

FIG. 11B illustrates a region unaffected by prop wash 1104 beneath the front of the UAS 100 whereby the region displays little effects from the propellers. region unaffected by prop wash 1104 is critical in locating the optimal placement of the gas sensor because it allows for minimal interference from the effects of prop wash on the in-situ gas sensor to be mounted to the UAS 100.

Figure 12:
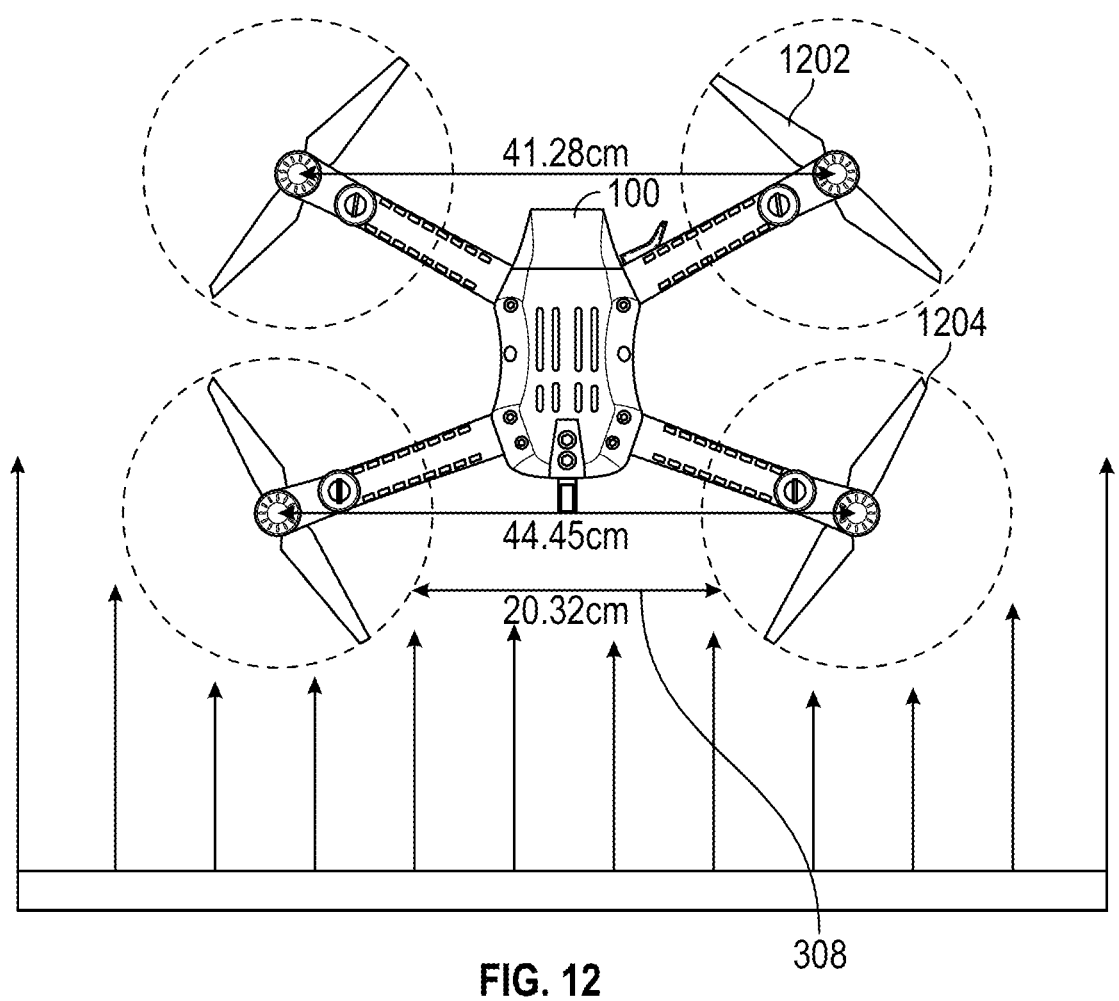
FIG. 12 illustrates the calculated region of airflow in accordance with some embodiments of the invention.

In accordance with some embodiments of the invention, as illustrated in FIG. 12 a UAS 100 may be configured with the front propellers 1204 spaced wider than apart from each other than the rear propellers 1202 respectively. The unique spacing of propellers, in accordance with many embodiments of the invention may provide for a more desirable region unaffected by prop wash in front of the UAS 100. The desired configuration of the UAS may be an overall function of the environmental conditions for which the UAS is intended to operate. As such, the optimal configuration may take on any suitable form.

Figure 13:
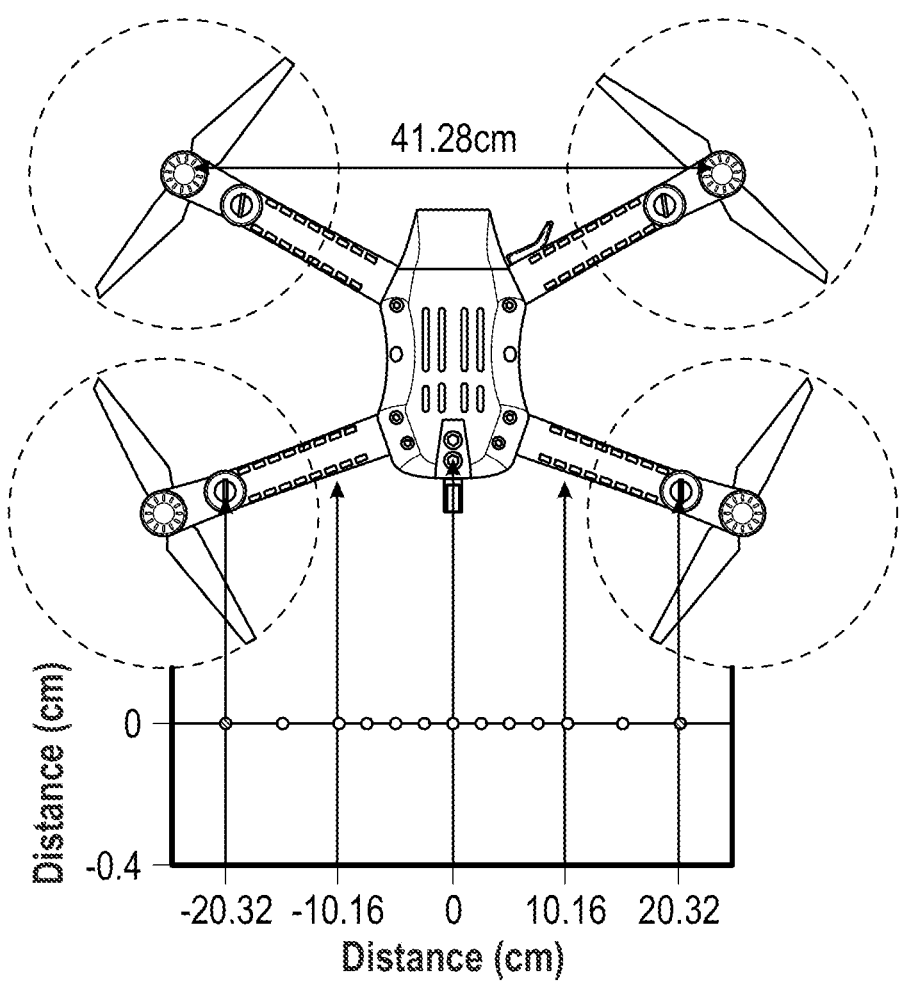
FIG. 13 illustrates a valid gas sensing region in accordance with many embodiments of the invention.

Turning now to FIG. 13 and in accordance with some embodiments of the invention, a UAS is illustrated in conjunction with a graphical representation of the results of a smoke plume test. In many embodiments, a smoke sensor mounted to a UAS may accurately detect smoke when in flight. The UAS traveling at a minimum rate of 2 m/s may provide proficient air flow for a mounted smoke sensor to detect smoke within the region unaffected by prop wash. As illustrated in FIG. 13 the smoke sensor is more accurate in the 20.36 cm region located in front of the selected UAS in accordance with some embodiments of the invention. In some embodiments of the invention the region unaffected by prop wash may be located in another location entirely. The illustration in FIG. 13 is a representation of one such embodiment.

Figure 14:
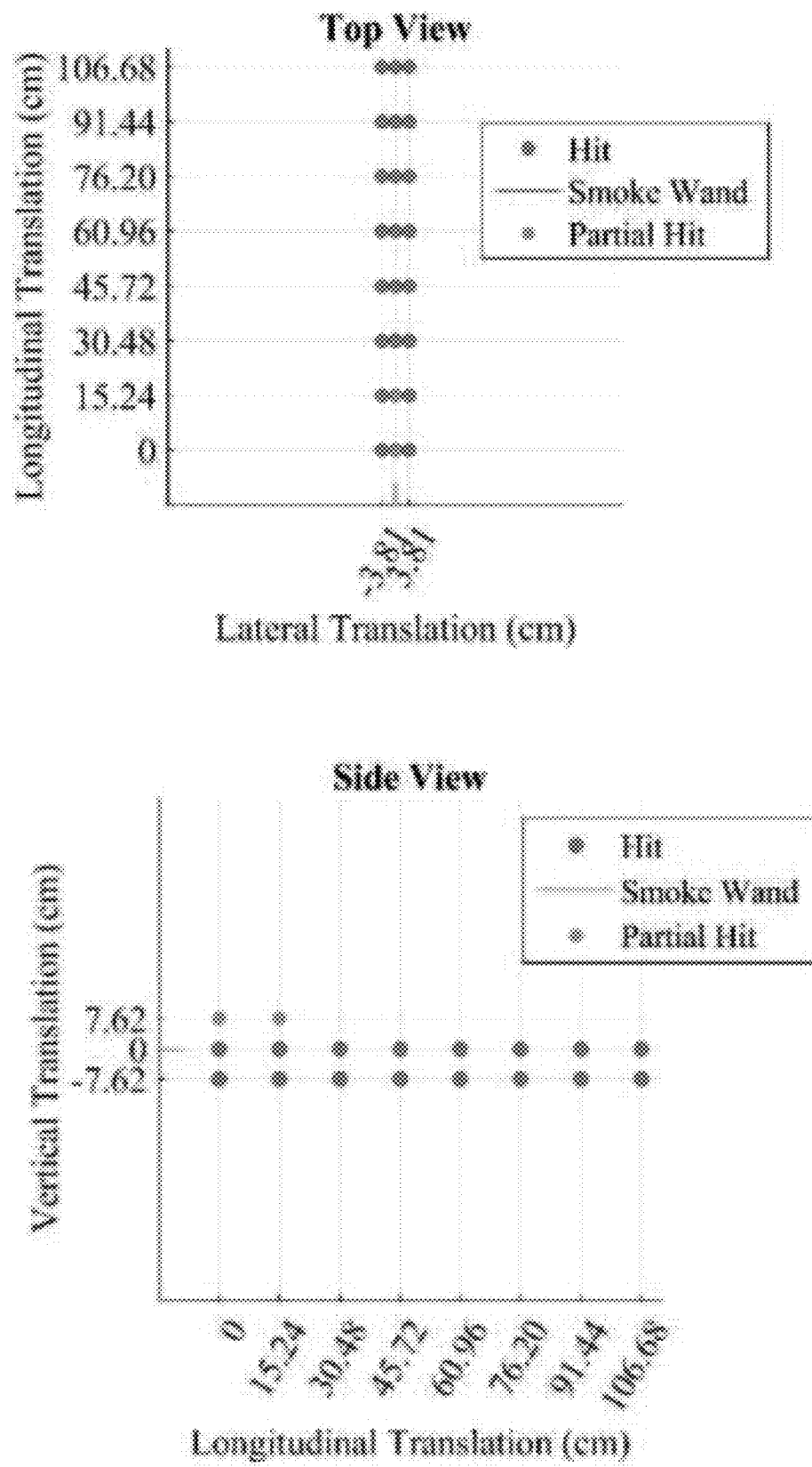
FIG. 14 illustrates the top and side view results of a smoke plume reconstruction using a handheld optical sensor

FIG. 14 is a graphical representation of a smoke plume reconstruction test when performed using a hand held smoke sensor. The top graph in FIG. 14 illustrates the lateral accuracy of the handheld sensor when moving longitudinally through a smoke plume when viewed from the top. This graph illustrates the most accurate region for detecting smoke with the handheld sensor is within a range of +/−3.81 cm from the center or location of the smoke wand.

The bottom graph in FIG. 14 illustrates the vertical accuracy of the handheld smoke sensor when moving longitudinally through the smoke plume when viewed from the side. Similar to the top graph, the bottom graphs illustrates the most accurate height of sensor detection with respect to the smoke plume.

The graphs in FIG. 14 indicate that the handheld sensor is less accurate as it moves closer to the smoke source, indicated by the increased number of partial hits.

In comparison, and in accordance with many embodiments of the invention, FIG. 15 illustrates the lateral and vertical accuracy of a smoke sensor mounted to a UAS when moving longitudinally through a smoke plume. It can be seen that the accuracy of the UAS increases as it approaches the smoke source; as indicated by the decreased number of partial hits. Furthermore, in many embodiments of the invention the accuracy of the UAS mounted sensor is best when the UAS operates at speeds between 2 and 3.8 m/s.

As is illustrated in many embodiments of the invention, comparing FIGS. 14 and 15 demonstrates that the UAS mounted sensor has increased accuracy when close to the smoke source. This is an improvement because it no longer requires a handheld sensor or human interaction as the UAS can be operated remotely or even autonomously.

DOCTRINE OF EQUIVALENTS

As can be inferred from the above discussion, the above-mentioned concepts can be implemented in a variety of arrangements in accordance with embodiments of the invention. For example, though the battery power supply has been described in relation to an electric vehicle, it will be understood that the supply could be adapted for use with other types of electric apparatus. Likewise, although the certain arrangements of power cells, outputs, inputs, case, etc., have been described other arrangements may be contemplated within the scope of the current disclosure.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An unmanned aerial system comprising:
   a vehicle body having a first vehicle end and a second vehicle end,
   at least one propulsion control system integrally connected to the vehicle body,
   at least one power source electronically connected to the at least one propulsion control system, at least one propulsion system electronically connected to and in signal communication with the at least one propulsion control system and connected to the vehicle body wherein the at least one propulsion system, in conjunction with the propulsion control system, is capable of producing at least a vertical and horizontal propulsion of the UAS and wherein the propulsion system generates at least a turbulent airflow region and at least one region unaffected by prop wash, at least one mounting apparatus with a first end and a second end wherein the at least one mounting apparatus is connected to the vehicle body such that the first end of the at least one mounting apparatus extends beyond the first vehicle end and the second end extends past the second vehicle end wherein the first end of the mounting apparatus is positioned in the at least one region unaffected by prop wash, at least one sensing device adjustably connected to the at least one mounting apparatus and positioned at the first end of the at least one mounting apparatus such that the sensing device is situationally positioned within the at least one region unaffected by prop wash of the UAS, and at least one sensing control device electronically connected to and in signal communication with the sensing device.

2. The unmanned aerial system of claim 1 wherein the at least one sensing control device is positioned at the second end of the at least one mounting apparatus.

3. The unmanned aerial system of claim 2 wherein the at least one anemometer is configured to utilize data from the at least one sensing device and the at least one sensing control unit.

4. The unmanned aerial system of claim 1 further comprising at least one anemometer connected to the vehicle body of the UAS and configured to utilize data from the at least one propulsion control system and the at least one sensing device.

5. The unmanned aerial system of claim 4 further comprising a second elongated mounting structure having a first end and a second end, wherein the first end of the second elongated body is connected to the vehicle body and the anemometer is configured to be positioned at the second end of the second elongated body.

6. The unmanned aerial system of claim 5 wherein the anemometer is configured to be positioned at a distance between 10 cm and 2 m from the vehicle body.

7. The unmanned aerial system of claim 1 wherein the at least one mounting apparatus is configured to have two elongated mounting bodies, each having a first end and a second end known as the first and second end of the mounting apparatus, wherein the at least one sensing device and at least one sensing control unit are configured to be slidingly engaged with the two elongated mounting bodies and wherein the at least one sensing device is configured to be positioned at the first end and the at least one sensing control device is configured to be positioned at the second end.

8. The unmanned aerial system of claim 7 further comprising at least one motor system connected to the at least one sensing device and the at least one sensing control unit and electronically connected to the at least one power source, whereby the at least one motor system coordinates the movement of the at least one sensing unit and the at least one sensing control unit such that as environmental conditions change thereby affecting the region unaffected by prop wash, the at least one sensing device is repositioned to remain within the region unaffected by prop wash and the at least one sensing control device is repositioned to effectively counterbalance the at least one sensing device.

9. The unmanned aerial system of claim 1 wherein the at least one mounting apparatus is configured to be a truss like structure having a first edge and a second edge wherein the first edge is connected to the second edge by a plurality of interconnection bridges.

10. The unmanned aerial system of claim 1 wherein the at least one sensing device and the at least one sensing control device are collocated within a single housing.

11. The unmanned aerial system of claim 10 further comprising at least one motor system connected to the at least one sensing device collocated with the at least one sensing control unit and electronically connected to the at least one power source, whereby the at least one motor system coordinates the movement of the at least one sensing unit collocated with the at least one sensing control unit such that as environmental conditions change thereby affecting the region unaffected by prop wash, the at least one sensing device is repositioned to remain within the region unaffected by prop wash.

12. The unmanned aerial system of claim 1, wherein the at least one sensing device comprises a methane sensor.

* * * * *